(12) United States Patent
Inagaki et al.

(10) Patent No.: US 8,041,350 B2
(45) Date of Patent: Oct. 18, 2011

(54) WIRELESS COMMUNICATION SYSTEM, METHOD OF MANAGEMENT, CONTROL AND MAINTENANCE, AND APPARATUS FOR THE SAME

(75) Inventors: Daisuke Inagaki, Kawasaki (JP); Noboru Hasegawa, Kawasaki (JP); Takeshi Masubuchi, Kawasaki (JP); Daisuke Nitta, Kawasaki (JP); Tetsuo Tomita, Kawasaki (JP); Tomonori Kumagai, Kawasaki (JP); Satoshi Watanabe, Kawasaki (JP); Kazunari Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 472 days.

(21) Appl. No.: 12/259,436

(22) Filed: Oct. 28, 2008

(65) Prior Publication Data

US 2009/0239520 A1    Sep. 24, 2009

(30) Foreign Application Priority Data

Mar. 19, 2008   (JP) ................................. 2008-070974

(51) Int. Cl.
   *H04W 4/00* (2009.01)
(52) U.S. Cl. .................................... 455/422.1; 455/423
(58) Field of Classification Search ......................... None
   See application file for complete search history.

(56) References Cited

U.S. PATENT DOCUMENTS

| | | | |
|---|---|---|---|
| 5,577,029 A | 11/1996 | Lu et al. | |
| 5,734,699 A | 3/1998 | Lu et al. | |
| 5,734,979 A | 3/1998 | Lu et al. | |
| 5,761,195 A | 6/1998 | Lu et al. | |
| 5,818,824 A | 10/1998 | Lu et al. | |
| 5,842,138 A | 11/1998 | Lu et al. | |
| 5,887,256 A | 3/1999 | Lu et al. | |
| 5,953,651 A | 9/1999 | Lu et al. | |
| 5,999,813 A | 12/1999 | Lu et al. | |
| 6,081,716 A | 6/2000 | Lu | |
| 6,101,400 A | 8/2000 | Ogaz et al. | |
| 6,173,177 B1 | 1/2001 | Lu et al. | |
| 6,212,395 B1 | 4/2001 | Lu et al. | |
| 6,535,732 B1 | 3/2003 | McIntosh et al. | |
| 6,580,924 B1 | 6/2003 | Lu et al. | |
| 6,597,912 B1 | 7/2003 | Lu et al. | |
| 6,829,477 B1 | 12/2004 | Lu et al. | |
| 7,310,519 B2 * | 12/2007 | Okita et al. | 455/418 |
| 2002/0009991 A1 | 1/2002 | Lu et al. | |
| 2002/0077112 A1 | 6/2002 | McIntosh et al. | |
| 2003/0003904 A1 * | 1/2003 | Matsumoto | 455/423 |

(Continued)

FOREIGN PATENT DOCUMENTS

| | | |
|---|---|---|
| JP | 2002-524989 | 8/2002 |
| JP | 2004-40802 | 2/2004 |
| KR | 1020040054126 | 6/2004 |

OTHER PUBLICATIONS

Korean Notice of Preliminary Rejection dated Jul. 30, 2010, from the corresponding Korean Application.

(Continued)

*Primary Examiner* — Ajit Patel
(74) *Attorney, Agent, or Firm* — Katten Muchin Rosenman LLP

(57) ABSTRACT

It administers a plurality of wireless base stations grouped into a plurality of groups, and performs the processing about the management, control and maintenance of the wireless base stations selectively for each of the groups. This enables the efficient management, control and maintenance processing of the wireless base stations.

19 Claims, 30 Drawing Sheets

U.S. PATENT DOCUMENTS

2003/0224777 A1* 12/2003 Sakuma .................. 455/423
2004/0004943 A1 1/2004 Kim et al.
2005/0221825 A1* 10/2005 Osugi .................... 455/436

OTHER PUBLICATIONS

Hiroki Yomogita "Korean Samsung, NEC and others Present Femto Cells" Nikkei Electronics, Feb. 20, 2007.

"Manufacturing Agreement for ZoneGate Low-Cost Residential 3G Access Point" Nov. 1, 2006, retrieved from http://www.3g.co.uk/PR/Nov2006/3849.htm.

Hidehiko Ohyane, et al. "Base Station Supporting IP Transport" Special Articles on IP-based RAN for Economical and Flexible Network Construction, NTT DoCoMo, Technical Journal, vol. 9, No. 1, p. 7-9, Apr. 2007.

* cited by examiner

WIRELESS COMMUNICATION SYSTEM, METHOD OF MANAGEMENT, CONTROL AND MAINTENANCE, AND APPARATUS FOR THE SAME

CROSS-REFERENCE TO RELATED APPLICATION(S)

This application is based upon and claims the benefit of priority of the prior Japanese Application No. 2008-70974 filed on Mar. 19, 2008 in Japan, the entire contents of which are incorporated by reference.

FIELD

The embodiment(s) discussed herein is directed to a wireless communication system, a method of management, control, and maintenance and a apparatus for management, control, and maintenance. The embodiment(s) is may be used for setting a wireless base station forming a small sized cell called femtocells.

BACKGROUND

The wireless coverage indoors of a mobile communication system is not so high. There are several reasons. For example, wireless electric waves are difficult to reach the inside of a building and it costs much to set and administer an indoor-type wireless base station.

Under this situation, a microminiature wireless base station (BTS: Base Transceiver Station) called "Femtocell" has been proposed recently. This BTS is assumed to be used inside a house or an office and it conforms to, for example, the Wideband-Code Division Multiple Access (W-CDMA) method, enabling a simultaneous communication for a small number of users (about four users) by forming a small sized cell (femtocell) having a radius of several tens meters. Further, the cost is low.

In order to improve the indoor coverage without raising the management cost, it is conceived that this microminiature BTS (hereinafter, referred to as a femtocell BTS) is arranged inside a tall building or an underground facility (dead zone) that could not be covered by the existing wireless base station.

Further, a technique of remotely setting an Radio Frequency (RF) unit connected with an existing base station via a cable line to the base station, is known as a means for improving the coverage of the mobile communication system.

[Patent Document 1] Japanese Patent Application Laid-Open No. 2004-40802
[Patent Document 2] Japanese Patent Application National Publication (Laid-Open) No. 2002-524989
[Non Patent Document 1] "A follow up article on 3GSM Korea Samsung and NEC exhibit "Femtocell"
[Non Patent Document 2] "Manufacturing Agreement For Zone Gate Low-Cost Residential 3G Access Point".
[Non Patent Document 3] NTT DoCoMo Technical Journal Vol. 15 No. 1, [online], April, 2007.

Since the femtocell BTS is supposed to be set indoors, the number of the femtocell BTSs being set is expected large. However, there is a limit to the capacity (for example, several hundreds BTSs) in a device that accommodates the base stations and controls them (RNC: Radio Network Controller). Therefore, it cannot help but increase the number of large-sized expensive RNCs, in order to accommodate a large number of femtocell BTSs (for example, more than several thousands BTSs).

SUMMARY (1) One aspect of the wireless communication system disclosed here includes a plurality of wireless base stations; and a apparatus for management, control, and maintenance that groups the wireless base stations into a plurality of groups and performs the processing about management, control and maintenance of the wireless base stations selectively for each of the groups, can be used.

(2) One aspect of a method of management, control, and maintenance disclosed here includes administering a plurality of wireless base stations grouped into a plurality of groups; and performing the processing about the management, control and maintenance of the wireless base stations selectively for each of the groups, can be used.

(3) One aspect of an apparatus for management, control, and maintenance disclosed here includes a control unit that administers a plurality of wireless base stations grouped into a plurality of groups; and a processor that performs the processing about the management, control and maintenance for the wireless base stations selectively for each of the groups, can be used.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

DESCRIPTION OF EMBODIMENT(S)

Figure 1:
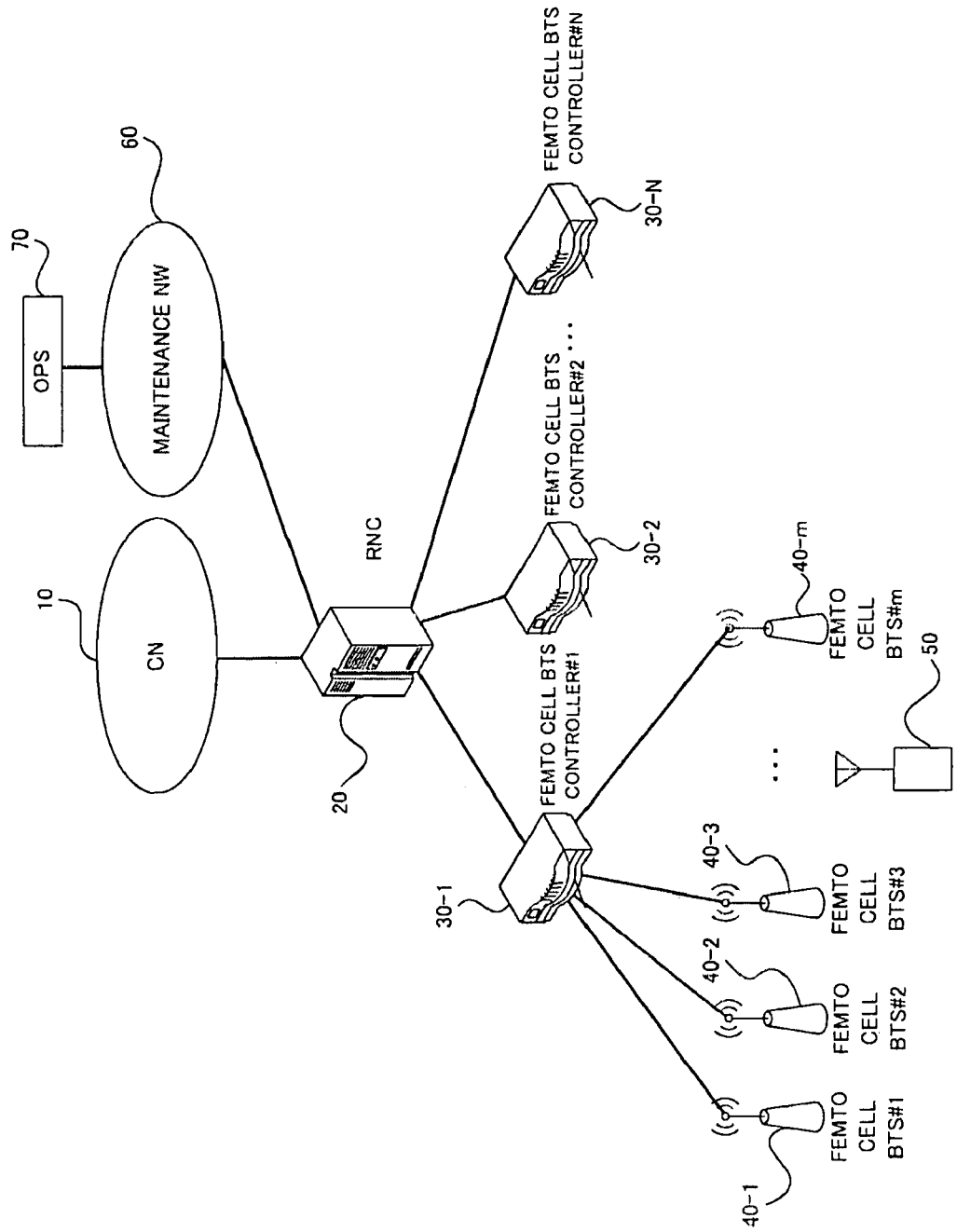
FIG. 1 is a view illustrating a constitutional example of a femtocell system as one example of wireless communication system according to one embodiment.

Hereinafter, an embodiment will be described referring to the drawings. The embodiment described below is only an example and it is not intended to exclude various modifications and applications of techniques not specified below. Namely, the embodiment can be performed variously modified (for example, in combination of the respective embodiment and the like) within the range not departing from the spirit.

[1] System Structure

FIG. 1 is a view illustrating a constitutional example of femtocell system as one example of a wireless communication system according to an embodiment. The system illustrated in FIG. 1 comprises, for example, a core network (CN) 10, at least one radio network controller (RNC, BTS controller) 20 connected to this CN 10, the number N (N is an integer of 1 or more) of microminiature BTS controllers (femtocell BTS controllers) 30-1 to 30-N (#1 to #N), the number m (m is an integer of 2 or more) of microminiature BTSs (femtocell BTSs) 40-1 to 40-m (#1 to #m) and one or a plurality of mobile terminals (user terminal) 50 as one example of user terminal.

The RNC 20 is connected to an operating system (OPS) 70 as one example of the upper apparatus through a maintenance network (NW) 60 in a communicable way, and it can perform a communication about the management, control and maintenance (OAM, Management/Control/Maintenance) with the OPS 70 if necessary. In this embodiment, the OAM processing means the processing including one or more of management, control, and maintenance and it does not means all of them are essential. Further, it is not intended to exclude the processing other than the above three.

Here, the upper networks than the RNC 20 located in a wireless access network such as W-CDMA are collectively called the CN 10, having entities for administering subscriber information, monitoring and administering the respective networks, and establishing connection to another network.

The RNC 20 is a apparatus that can accommodate and control one or a plurality of existing base stations (BTS) (it is also called Node B), and is provided with a function of transferring signals such as data (namely, control signals) of control plane (C-Plane) and data (namely, user signals) of user plane (U-Plane) between the existing BTSs.

The C-Plane data includes, for example, a call control signal destined for the mobile terminal 50 and a Node B application part (NBAP) signal that is a signal about a base station control. In terms of a wireless channel between the femtocell BTS controller 30-$i$ ($i$=1 to N) and the femtocell BTS 40-$j$ ($j$=1 to m), the C-Plane data includes the signals about a common channel, an individual channel, an announcement channel, and a paging channel. The U-Plane data includes the signals about a common channel and an individual channel.

The RNC 20 of this example can accommodate the number N of femtocell BTS controllers 30-1 to 30-N together with or alternatively to the existing BTSs and it can transfer the signals between these femtocell BTS controllers 30-$i$ in the same way as between the existing BTSs. The connection interface (IF) between the RNC 20 and the femtocell BTS controller 30-$i$ may be the same as the connection IF (for example, Iub interface) between the RNC 20 and the existing BTS.

The femtocell BTS controller (hereinafter, represented as FBTS controller) 30-$i$ can respectively accommodate the number m of the femtocell BTSs (hereinafter, represented as FBTS) 40-1 to 40-$m$. The FBTS controller (apparatus for management, control, and maintenance) 30-$i$ of the embodiment can perform call processing (call, registration of position, paging, notification, U-Plane signal processing and the like), OAM processing (including the processing such as failure detection, congestion control, and program update) and cell setting on a subordinate FBTS 40-$j$.

The "cell setting" means the setting about the wireless resources for a cell formed by the FBTS 40-$j$. The wireless resources include one or a combination of two or more of scrambling code (SC), channelization code (CC), and usable frequency (carrier), in every cell, taking the W-CDMA method as an example. The SC is a code for use in identifying a cell (cell search) and the CC is a code for use in identifying the user (mobile terminal 50).

By introducing this FBTS controller 30-$i$, the RNC 20 performs the cell setting for one existing BTS on one FBTS controller 30-$i$, using the same control signal (for example, NBAP signal) as that for the existing BTS, hence to make it possible to collectively perform the necessary cell setting on the respective subordinate FBTS 40-$j$ of the FBTS controller 30-$i$.

In other words, a plurality of the FBTSs 40-$j$ can be regarded (recognized) virtually as one BTS seen from the RNC 20. For example, the respective FBTSs 40-$j$ can be recognized by the RNC 20 as one BTS that handles a plurality of cells and carriers like a multi-band BTS or a high intensity BTS.

For example, the RNC 20 can recognize the FBTSs as a BTS having the total nine cells of three cells x three carriers (frequency). In this case, the RNC 20 assigns the cell setting information (wireless resources) for nine cells to the FBTS controller 30-$i$ according to the NBAP signal. Namely, the number of the cell setting information that can be assigned to the FBTS controller 30-$i$ is less than the number of the cell setting information that the RNC 20 recognizes and administers.

The FBTS 40-$j$ is a base station that can form a cell that is a wireless zone, to perform a wireless communication through connection to one or a plurality of mobile terminals 50 present in the above cell via a wireless link, and it is set, for example, inside a house or an office. The FBTS 40-$j$ is different from the usual (existing) BTS in the following points.

(1) In the existing BTS, the number of users (mobile terminals) simultaneously connectable is several hundreds, while in the FBTS, it is small, about ten.

(2) In the existing BTS, the number of cells is about several to several tens, while in the FBTS, it is microminiature, about one.

(3) In the existing BTS, the coverage of electric waves (radius of a cell) is some kms, while in the FBTS, it is narrow, several ten meters.

The FBTS 40-$j$ may be almost the same as the existing BTS in a function and a message transferred to and from the outside.

The mobile terminal 50 is a wireless terminal used by a user, provided with a function of performing a communication with a FBTS 40-$j$ through connection via a wireless link (for example, terminating function of call processing).

[2] FBTS Controller and FBTS

The constitutional example of the FBTS controller 30-$i$ and the FBTS 40-$j$ of this embodiment will be described referring to FIG. 2.

(2.1) FBTS Controller

Figure 2:
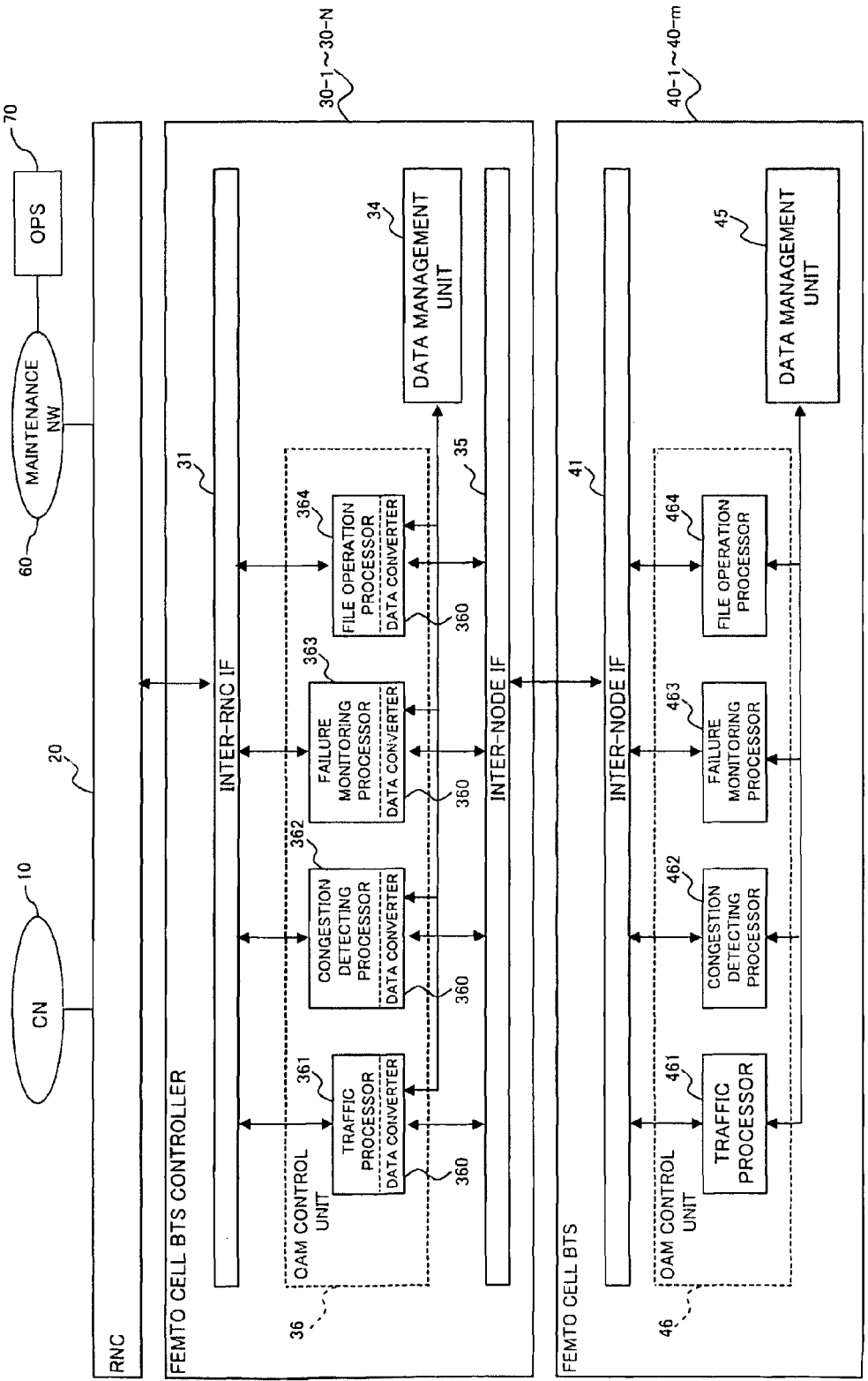
FIG. 2 is a block diagram illustrating a detailed constitutional example of the system illustrated in FIG. 1.

As illustrated in FIG. 2, the FBTS controller 30-$i$ includes, for example, an inter-RNC IF 31, a data control unit 34, an inter-node interface (IF) 35, and an OAM control unit 36.

Here, the inter-RNC IF 31 is an IF with the RNC 20, provided with a function of transmitting and receiving the signals such as C-Plane data (control signals) and U-Plane data (user data) to and from the RNC 20.

The data control unit 34 performs the data control and control of station data, constitution data, and cell setting data. The station data includes information about a connection state such as which RNC 20 or which FBTS 40-$j$ the subject station 30-$i$ is connected to and information about a connected apparatus number. The constitution data is data for use in administering and controlling the subordinate FBTS 40-$j$ and it is created based on the information element of the station data. This constitutional data includes, for example, data for every subordinate FBTS 40-$j$ and data for each of the groups of the subordinate FBTSs 40-$j$. The details will be described later.

Additionally, the data control unit 34 of the embodiment can collect data, administer synchronization control to the subordinate FBTS 40-$j$, and administer information (for example, failure information, congestion information, and file version of a program file and a setting file) of the subject station (FBTS controller) 30-$i$, based on the group information of the subordinate FBTSs 40-$j$, when performing the OAM processing.

The inter-node IF 35 is an IF with the FBTS 40-$j$, provided with a function of transmitting and receiving signals such as C-Plane data (including the NBAP signal) and U-Plane data.

The OAM control unit 36 controls the OAM processing for the subordinate FBTS 40-$j$ connected through the inter-node IF 35. The OAM processing can be performed selectively for each of a plurality of groups of the FBTSs 40-$j$. Selectively performing means that some groups become the target for the OAM processing and that the others do not become the target, as a result of a check of a predetermined threshold about the OAM processing.

The OAM processing includes, for example, failure monitoring (detection), failure notification, congestion monitoring (detection), congestion notification, congestion control as for the FBTS 40-$j$ and/or the FBTS controller 30-$i$, update of data (including station data, constitution data, and various data such as a program file and a setting file) possessed by the FBTS 40-$j$, and other processing. The OAM control unit 36 can selectively have functional (processing) units depending on the OAM processing if necessary.

As illustrated in FIG. 2, the OAM control unit 36 includes a traffic processor 361, a congestion detecting processor 362, a failure monitoring processor 363, and a file management processor 364. In FIG. 2, illustration of a function block related to call processing in a call controller is omitted.

The traffic processor 361 monitors, administers, and controls a communication traffic (hereinafter, referred to as "traffic" simply) between the FBTS controller and the upper RNC 20 and/or between the FBTS controller and the subordinate FBTS 40-$j$, as one of the OAM processing.

The congestion detecting processor 362 detects, administers, and controls congestion in the FBTS controller 30-$i$ and/or the subordinate FBTS 40-$j$, according to the communication traffic, as one of the OAM processing.

The failure monitoring processor 363 monitors state of failure in the FBTS controller 30-$i$ and/or the subordinate FBTS 40-$j$ and notifies the failure to a concerned unit, as one of the OAM processing.

The file management processor 364 performs processing about data (file) management such as updating and transferring various data including station data, constitution data, program file, and setting file possessed by the FBTS controller 30-$i$ and/or the subordinate FBTS 40-$j$, as one of the OAM processing.

The above respective processors 361 to 364 are provided with data (format) converters 360, and the data converters 360 can convert signals into suitable formats respectively for a communication with the RNC 20 and a communication with the subordinate FBTS 40-$j$. For example, when converting signals into the existing signal format used for a communication with the RNC 20, the FBTS controller 30-$i$ can be accommodated into the RNC 20 without modifying the RNC 20 extensively. The data converters 360 may be shared by the respective processors 361 to 364.

One or all of the functions of the above FBTS controller 30-*i* may be provided in the RNC 20.

When one of the functions of the RNC 20 is built in a base station, like an eNode B in the next generation mobile communication system, the FBTS controller 30-*i* may be connected not to the RNC 20 but to the eNode B, or the upper apparatus of the eNode B such as access gateway (aGW). In this case, the FBTS controller 30-*i* can perform the OAM processing and the cell setting on the subordinate FBTS 40-*j*, for example, after being assigned the information on the OAM processing and the cell setting information for the number of cells set at one eNode B from this eNode B or the upper apparatus.

(2.2) FBTS

The FBTS 40-*j* illustrated in FIG. 2 includes, for example, an inter-node (Node B) interface (IF) 41, a data administering unit 45, and an OAM control unit 46. In FIG. 2, a function block concerned about call processing by a call controller is not illustrated.

The inter-node IF 41 is an IF with the FBTS controller 30-*i*, provided with a function of transmitting and receiving signals such as C-Plane data (including the NBAP signal) and U-Plane data.

The data control unit 45 administers and controls data such as station data, constitution data, and cell setting data.

The OAM control unit 46 controls the OAM processing of the subject station (FBTS 40-*j*). This OAM processing includes, for example, failure monitoring (detection), failure notification, congestion monitoring (detection), congestion notification, congestion control, update of data (including various data such as station data, constitution data, program file, and setting file) possessed by the FBTS 40-*j* and the other processing. This OAM processing can be performed in comanagement with the FBTS controller 30-*i* through the inter-node IF 41 depending on necessity. The OAM control unit 46 may be selectively provided with a function (processing) unit depending on the OAM processing if necessary.

As illustrated in FIG. 2, the OAM control unit 36 includes a traffic processor 461, a congestion detecting processor 462, a failure monitoring processor 463, and a file management processor 464.

The traffic processor 461 monitors, administers, and controls a communication traffic between itself and the upper FBTS controller 30-*i* and/or between itself and a mobile terminal 50 connected to this station 40-*j*, as one of the OAM processing.

The congestion detecting processor 462 detects, administers, and controls a congestion state, according to the communication traffic, as one of the OAM processing.

The failure monitoring processor 463 monitors the state such as occurrence of failure and notifies the OPS 70 of the monitoring result as one of the OAM processing.

The file management processor 464 controls file managements such as update of various kinds of files including a program file and a setting file of the subject station 40-*j*, as one of the OAM processing.

(2.3) Grouping Information and Constitution Data of FBTS

In this embodiment, grouping information and constitution data as for the FBTS 40-*j* are used in order to perform the OAM processing on the FBTS 40-*j* individually and/or each group of the FBTSs 40-*j*.

(2.3.1) Grouping Information

Figure 3:
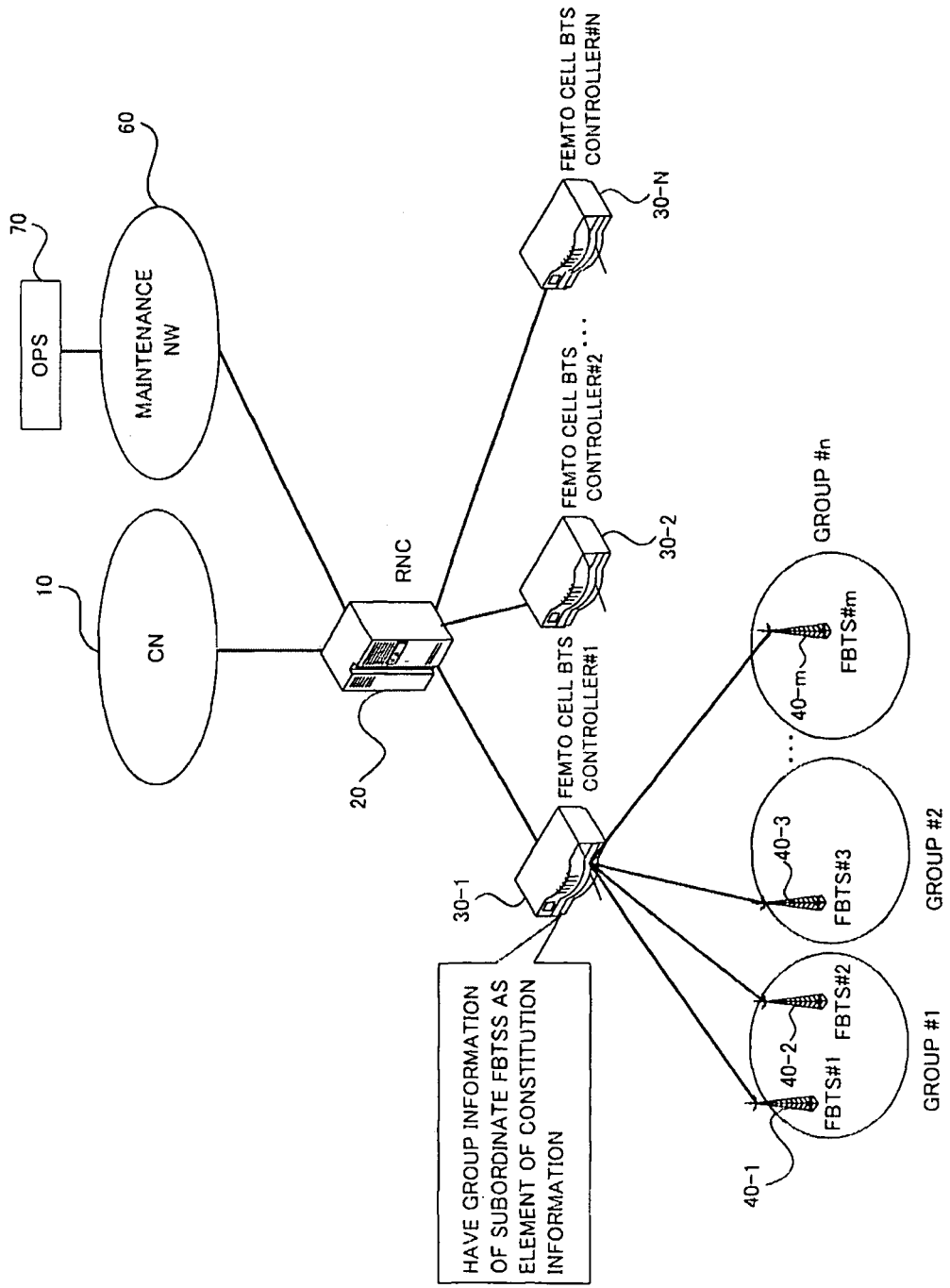
FIG. 3 is a view for use in describing an image of the grouping of FBTS in the system illustrated in FIG. 1.

The FBTS controller 30-*i* (OAM control unit 36) administers each of FBTS groups #1 to #n each including one or a plurality of the connected subordinate FBTSs 40-*j* (where, n is an integer satisfying $2 \leq n < m$), as illustrated in FIG. 3. The OAM control unit 36 can collect and administer the failure information and the congestion information of the FBTS 40-*j* for every group #k (k=1 to n). This can reduce a communication load of a network and a processing load in the upper RNC 20.

The grouping may be optionally set suitably to the OAM processing. For example, the FBTSs 40-*j* may be grouped for each setting place (area). An example of the grouping is respectively illustrated in FIG. 4 and in FIG. 5.

Figure 4:
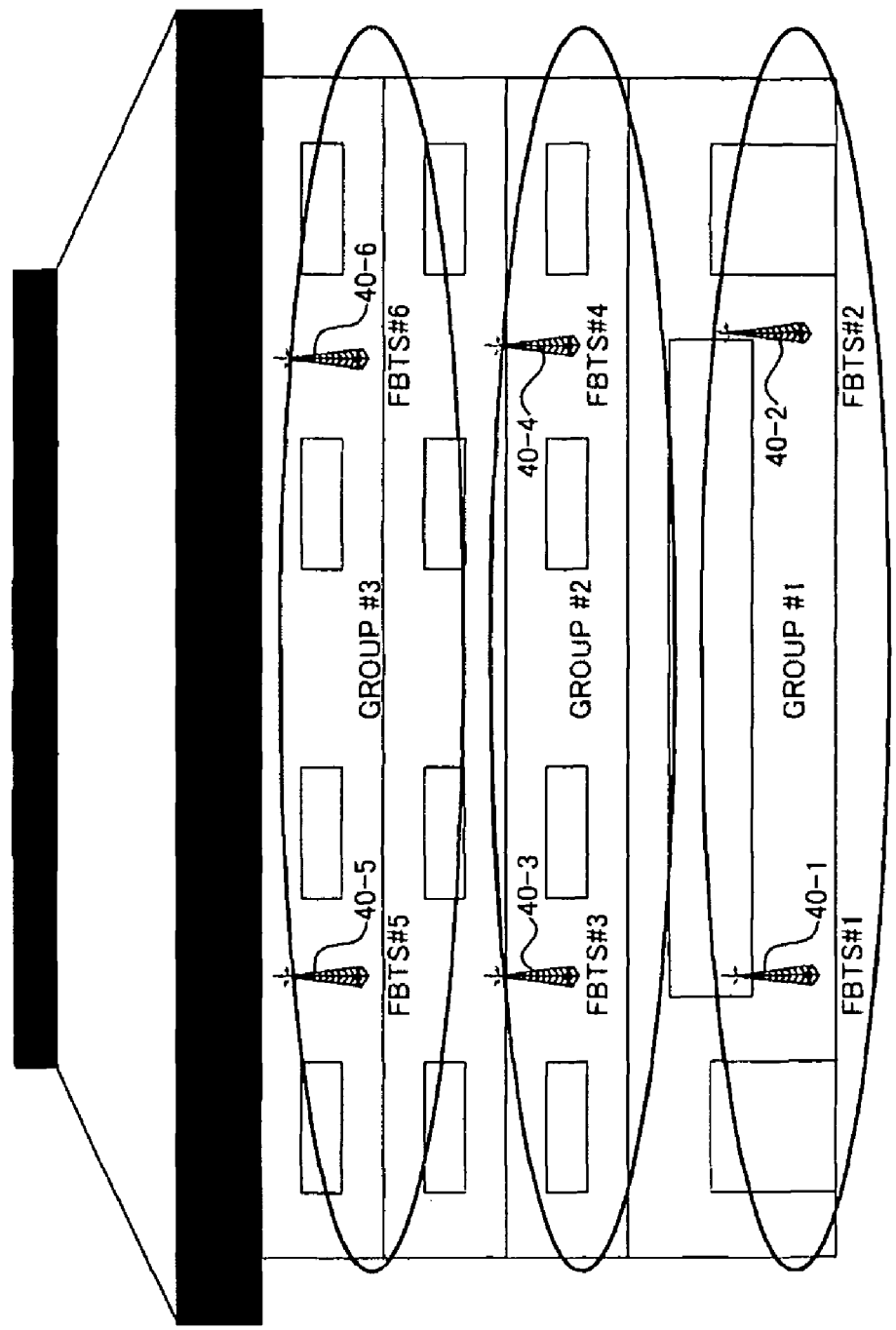
FIG. 4 is a view for use in describing an image of the grouping of FBTS in the system illustrated in FIG. 1.

FIG. 4 illustrates the state of setting the FBTSs 40-*j* inside a building. FIG. 4 illustrates that two FBTSs 40-*j* are set in each floor, and the FBTSs 40-*j* are grouped for each floor. For example, the FBTS 40-1 and 40-2 in the ground floor belong to the group #1, the FBTS 40-3 and 40-4 in the second floor belong to the group #2, and the FBTS 40-5 and 40-6 in the third floor belong to the group #3.

Figure 5:
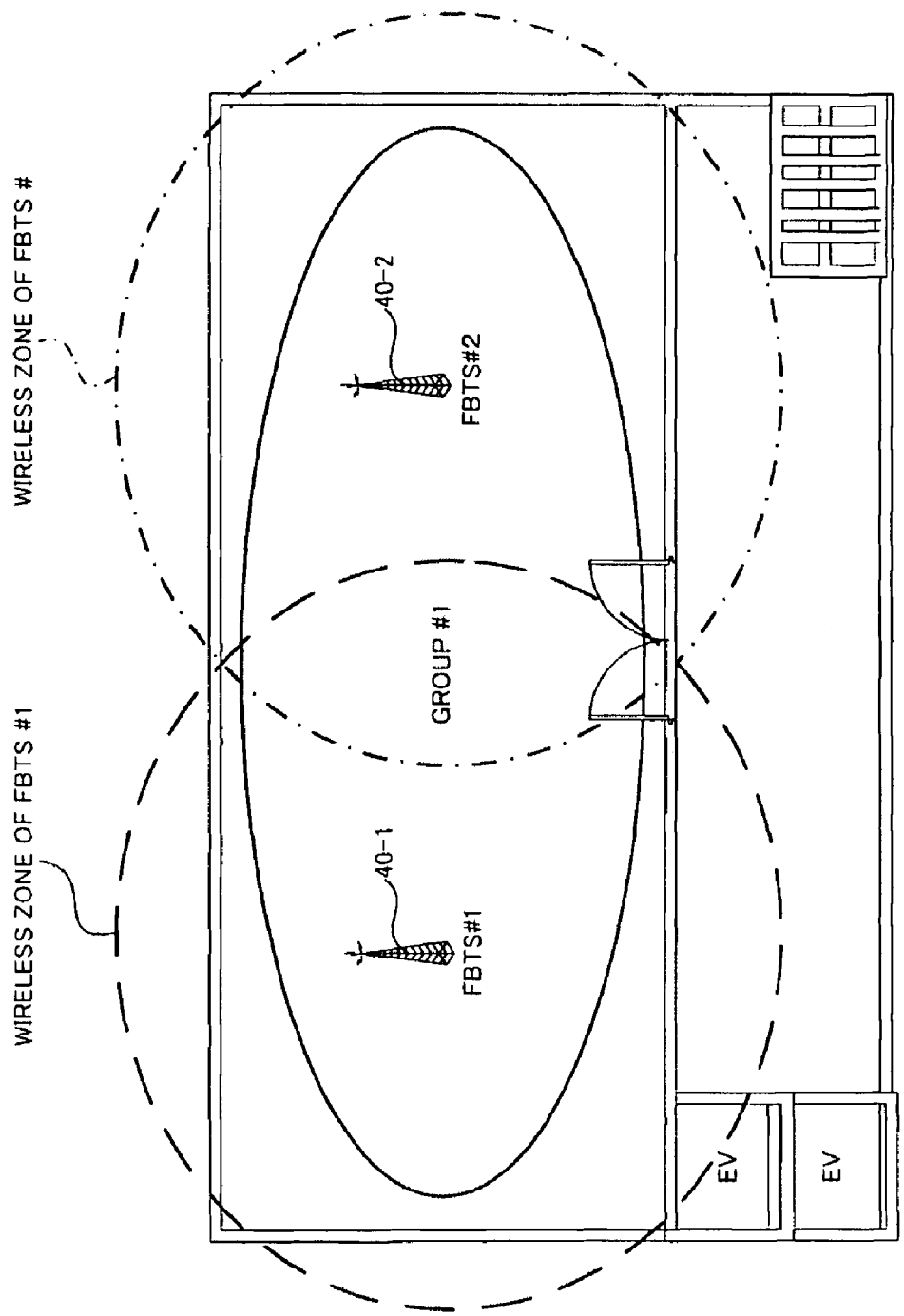
FIG. 5 is a view for use in describing an image of the grouping of FBTS in the system illustrated in FIG. 1.

On the other hand, FIG. 5 illustrates the state in which two FBTS 40-1 and 40-2 are set in one floor of a building and these two FBTS 40-1 and 40-2 are set as one group #1.

It is needless to say that the FBTSs 40-*j* may be grouped into a plurality of groups in one floor. Alternatively, a plurality of FBTSs 40-*j* set in different floors may be grouped as one group.

Figure 6:
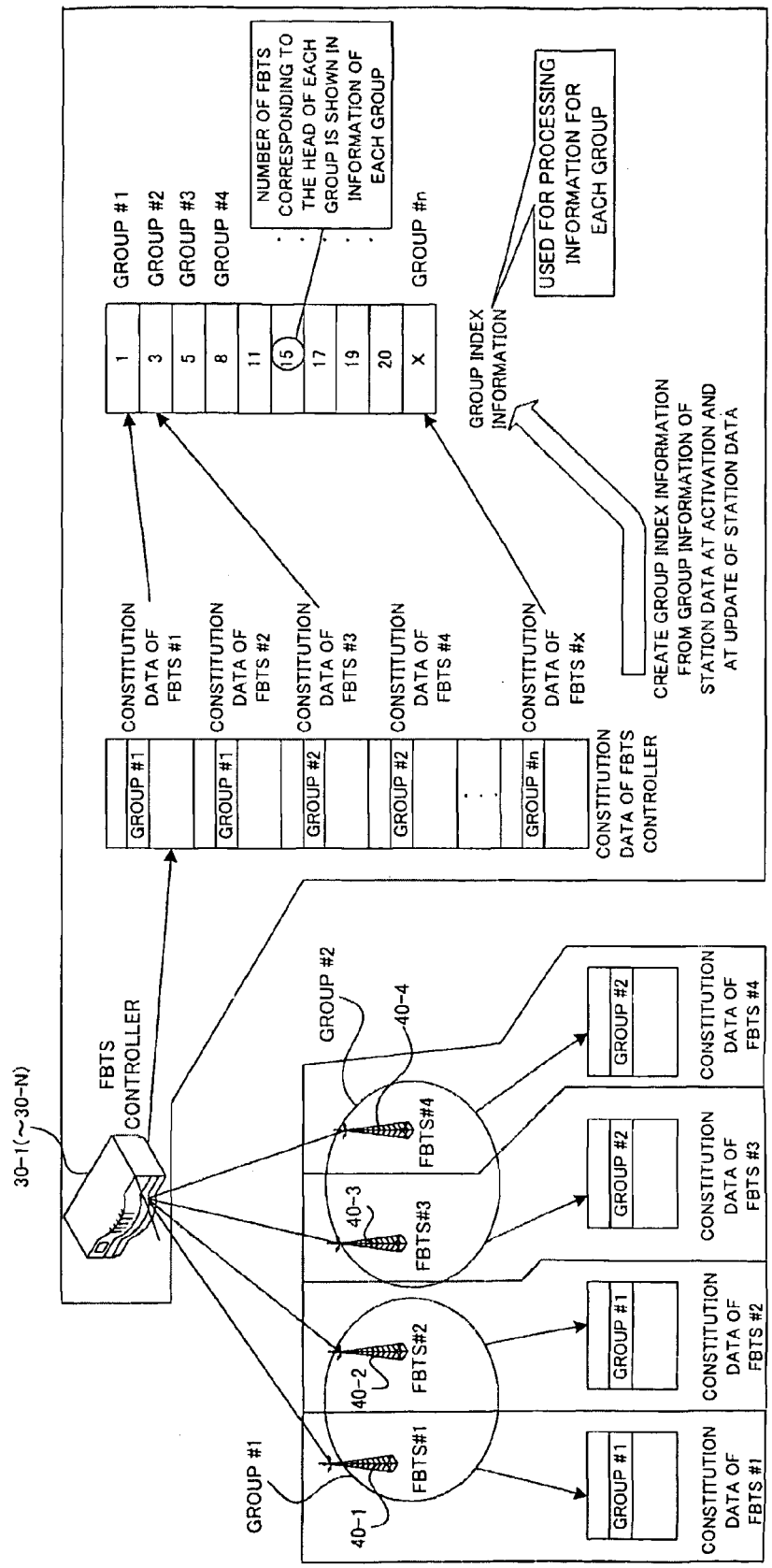
FIG. 6 is a view for use in describing one example of the group information administered by the FBTS controller illustrated in FIG. 1.
Figure 7:
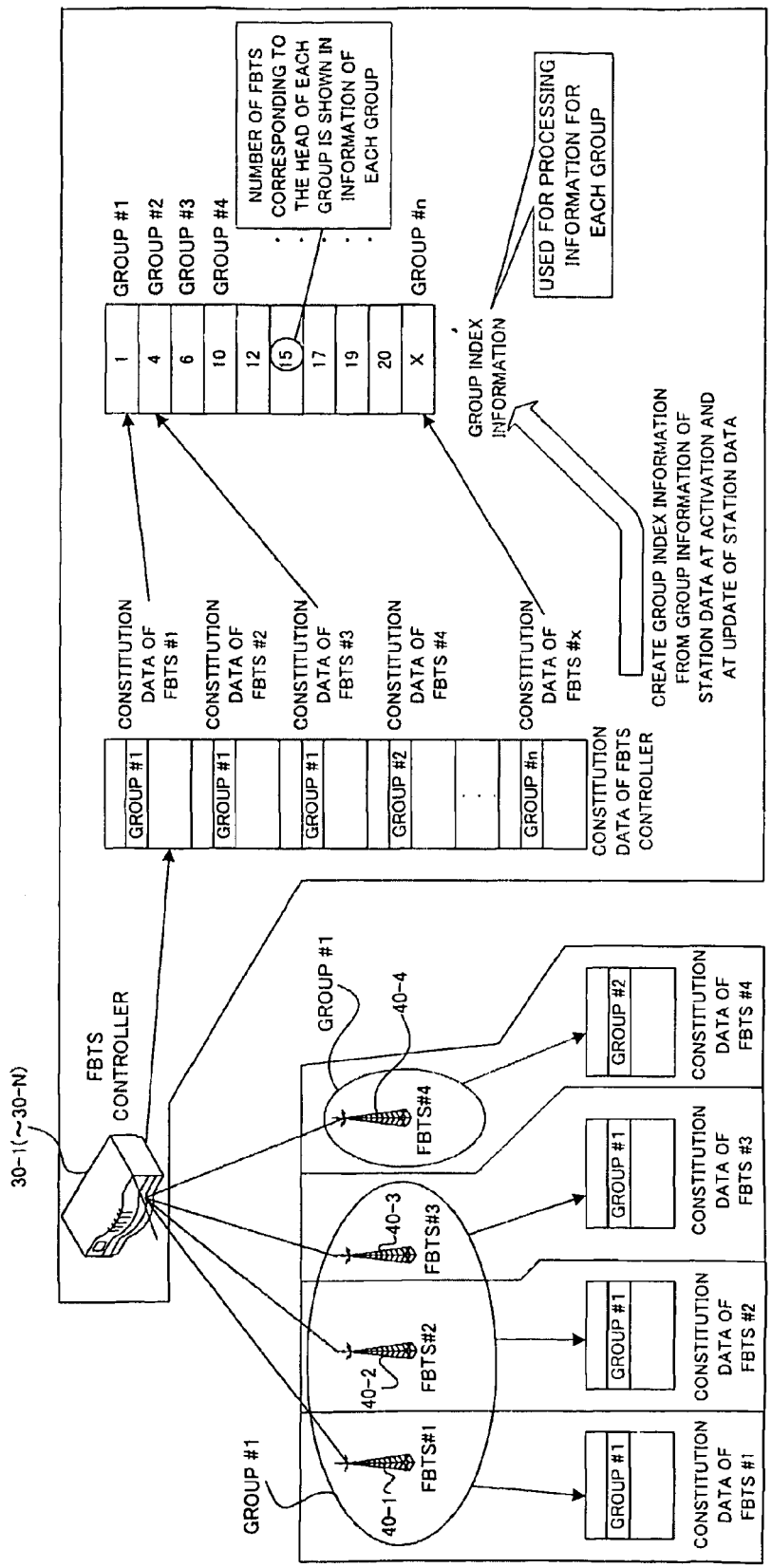
FIG. 7 is a view for use in describing one example of the group information administered by the FBTS controller illustrated in FIG. 1.

The above grouping may be realized through storing and administering the grouping information as illustrated in FIG. 6 and FIG. 7, for example, by the data control unit 34 accessible by the OAM control unit 36 in the FBTS controller 30-*i* and by the data control unit 45 accessible by the OAM control unit 46 in the FBTS 40-*j*.

Namely, as illustrated in FIG. 6, when two FBTS 40-1 and 40-2 belong to the group #1 and the other two FBTS 40-3 and 40-4 belong to the group #2, the respective data control units 45 store and administer the information (grouping information) for identifying which group #k each subject station 40-*j* belongs to, in the respective FBTSs 40-1 to 40-4. This grouping information can be administered, for example, included in the constitution data in every FBTS 40-*j*. The constitution data includes the failure information and the congestion information on the FBTS 40-*j*.

On the other hand, in the FBTS controller 30-*i*, the constitution data for the respective subordinate FBTS 40-1 to 40-4 is collected and the data control unit 34 stores and administers the data for every group #k, based on the grouping information. At that time, group index information indicating representative data (for example, the constitution data in the head) of every group #k can be created, in order to retrieve the constitution data efficiently. FIG. 6 illustrates the apparatus number=1 of the FBTS 40-1 belonging to the group #1 and the apparatus number=3 of the FBTS 40-3 belonging to the group #2 as the group index information (head apparatus number in the group).

The OAM control unit 36 can retrieve and specify desired constitution data efficiently in the data control unit 34 according to this group index information. The group index information can be created at a predetermined timing, for example, at a time of turning on the FBTS controller 30-*i* and at a time of updating the station data.

On the other hand, FIG. 7 illustrates an example of the data control in the case where three FBTS 40-1, 40-2, and 40-3 belong to the group #1 and one FBTS 40-4 belongs to the group #2. In this case, the apparatus number=1 of the FBTS 40-1 belonging to the group #1 and the apparatus number=4 of the FBTS 40-4 belonging to the group #2 are illustrated as the group index information (head apparatus number in the group #k).

(2.3.2) Constitution Data

As an example, the constitution data includes two kinds of data: constitution data by apparatuses and constitution data by groups. The constitution data by apparatuses is the data for every FBTS 40-j and the constitution data by groups is the data for every group #k (unit of a plurality of FBTSs 40-j). The following table 1 illustrates an example of the constitution data by apparatuses and the following table 2 illustrates an example of the constitution data by groups.

TABLE 1

Constitution Data by Apparatuses

| Apparatus Number | Group Number | IP Address | State of Apparatus | Traffic Amount | Congestion | File Identifier | Version | ... |
|---|---|---|---|---|---|---|---|---|
| femtocell BTS#1 | #1 | xx.xx.xx.xx | Failure | A | OFF | xxx | XXX | ... |
| femtocell BTS#2 | #1 | yy.yy.yy.yy | Normal | B | ON | yyy | YYY | ... |
| ... | ... | ... | ... | ... | ... | ... | ... | ... |
| femtocell BTS#m | #n | ... | ... | ... | ... | ... | ... | ... |

As illustrated in the table 1, the constitution data by apparatuses includes group number, IP address, state of apparatus, congestion (for example, ON in the event of congestion and OFF in the case of no congestion or recovery from congestion), identifier of each file such as a program file and a setting file, version of the file, in every apparatus number (#1 to #m) of the FBTS 40-1 to 40-m, as the information element.

TABLE 2

Constitution Data by Groups

| Group Number | Failure Rate | Threshold of Failure | Traffic Amount | Threshold of Congestion | Threshold of Recovery from Congestion | Setting Area | ... |
|---|---|---|---|---|---|---|---|
| group #1 | C | Notify at failure C | E | Notify at E or more | Recovery at G or less | I | ... |
| group #2 | D | Notify at failure D | F | Notify at F or more | Recovery at H or less | J | ... |
| ... | ... | ... | ... | ... | ... | ... | ... |
| group #n | ... | ... | ... | ... | ... | ... | ... |

As illustrated in the table 2, the constitution data by groups includes failure rate, threshold of the failure rate (threshold of failure), traffic amount, threshold of congestion, threshold of recovery from congestion, and setting area of the FBTS 40-j, in every group number (#1 to #n) as the information element.

Details of the information element of the above constitution data will be properly described in the following description of the management.

[3] Description of Management

Hereinafter, an example of the management (OAM processing) of the above system will be described. The OAM processing of this embodiment includes, for example, (1) failure detection and failure notification/control, (2) congestion detection and congestion notification/control, and (3) file update. In the following, the above processing will be described individually in separate sections. In this system (FBTS controller 30-i and FBTS 40-j), not all of the three kinds of the OAM processing is required but either one or a combination of two or more of the above may be performed.

(3.1) Failure (Fault) Control

When the OAM control unit 46 (failure monitoring processor 463) detects failure information of the subject FBTS 40-j, it transmits the failure information to the upper FBTS controller 30-i. The FBTS controller 30-i notifies the OPS 70 of the failure information through the maintenance network 60.

The FBTS controller 30-i checks whether or not the failure information should be notified to the OPS 70 by comparison between the failure rate and the threshold of failure in every group #k (threshold check), and when determining that the notification is necessary, it transmits the failure information to the OPS 70. Further, when the FBTS controller 30-i receives an inquiry about a failure situation from the OPS 70, it transmits the failure information stored and administered in the data control unit 34 as the constitution data to the OPS 70.

(3.1.1) Case of Notifying Failure (Fault) of FBTS to OPS

An management example in the case of notifying the OPS 70 of a failure (fault) occurring in one of the FBTSs 40-j will be described by using FIGS. 8 to 10.

Assume that a failure occurs in the subordinate FBTS 40-2 (#2) in the FBTS controller 30-1 (#1). Further, assume that the failed FBTS #1 and the normal FBTSs #2 and #3 belong to the group #1 under the FBTS controller #1 as a state before the failure of the FBTS #2 occurs and that the threshold of failure is ⅔.

Figure 9:
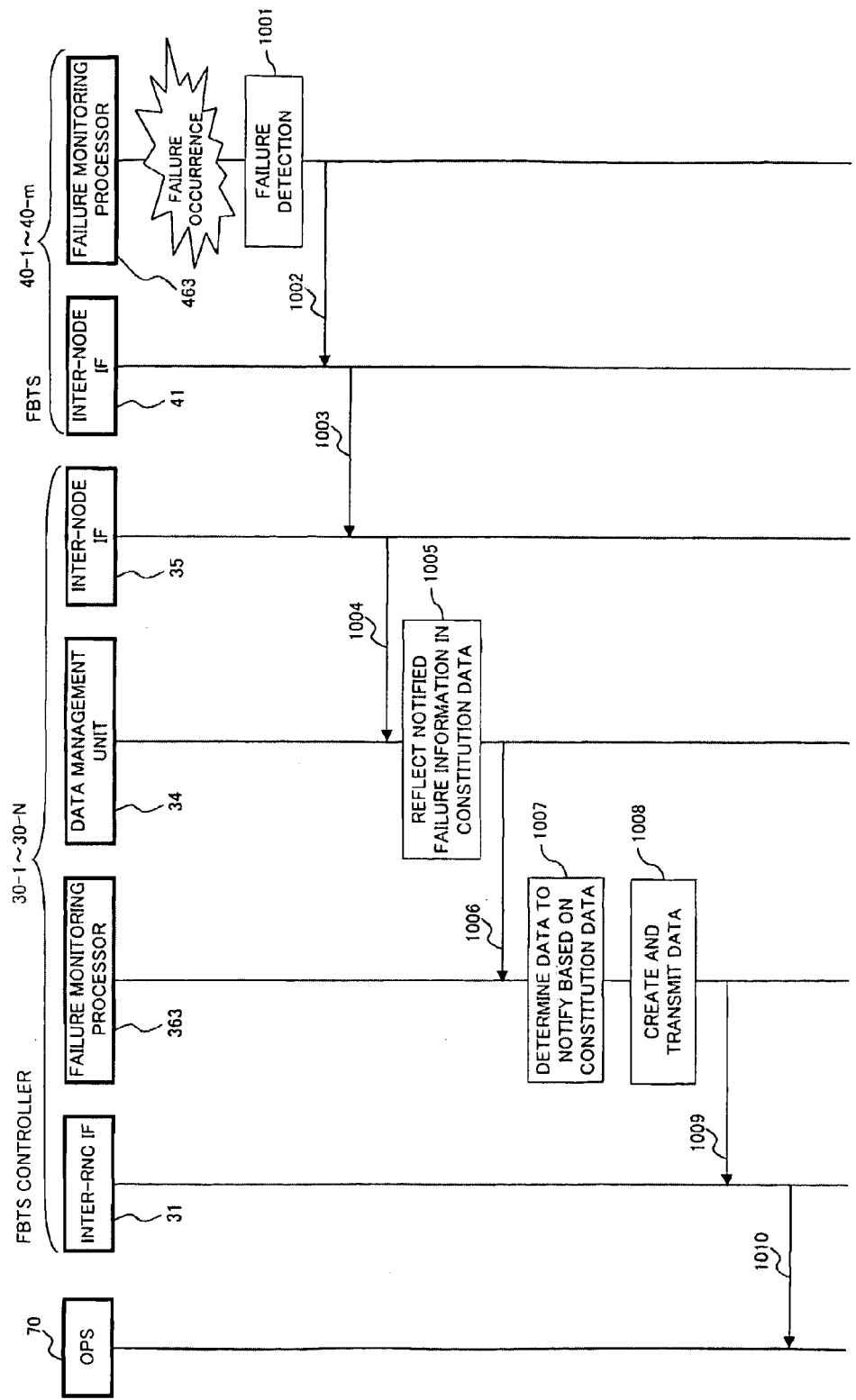
FIG. 9 is a sequence view for use in describing one example of failure detection and failure notification processing in the system illustrated in FIG. 1.

As illustrated in FIG. 9, when the failure monitoring processor 463 of the FBTS #2 detects a failure (the processing 1001), the failure monitoring processor 463 of the FBTS #2 notifies the upper FBTS controller #1 of the detected failure contents (failure information), for example, being included in a failure notification message (the processing 1002 and the processing 1003), through the inter-node IF 41.

By receiving the failure notification message in the inter-node IF 35 (the processing 1003 in FIG. 9 and the processing 1021 in FIG. 10), the FBTS controller #1 transfers the message to the data control unit 34 (the processing 1004 in FIG.

Figure 10:
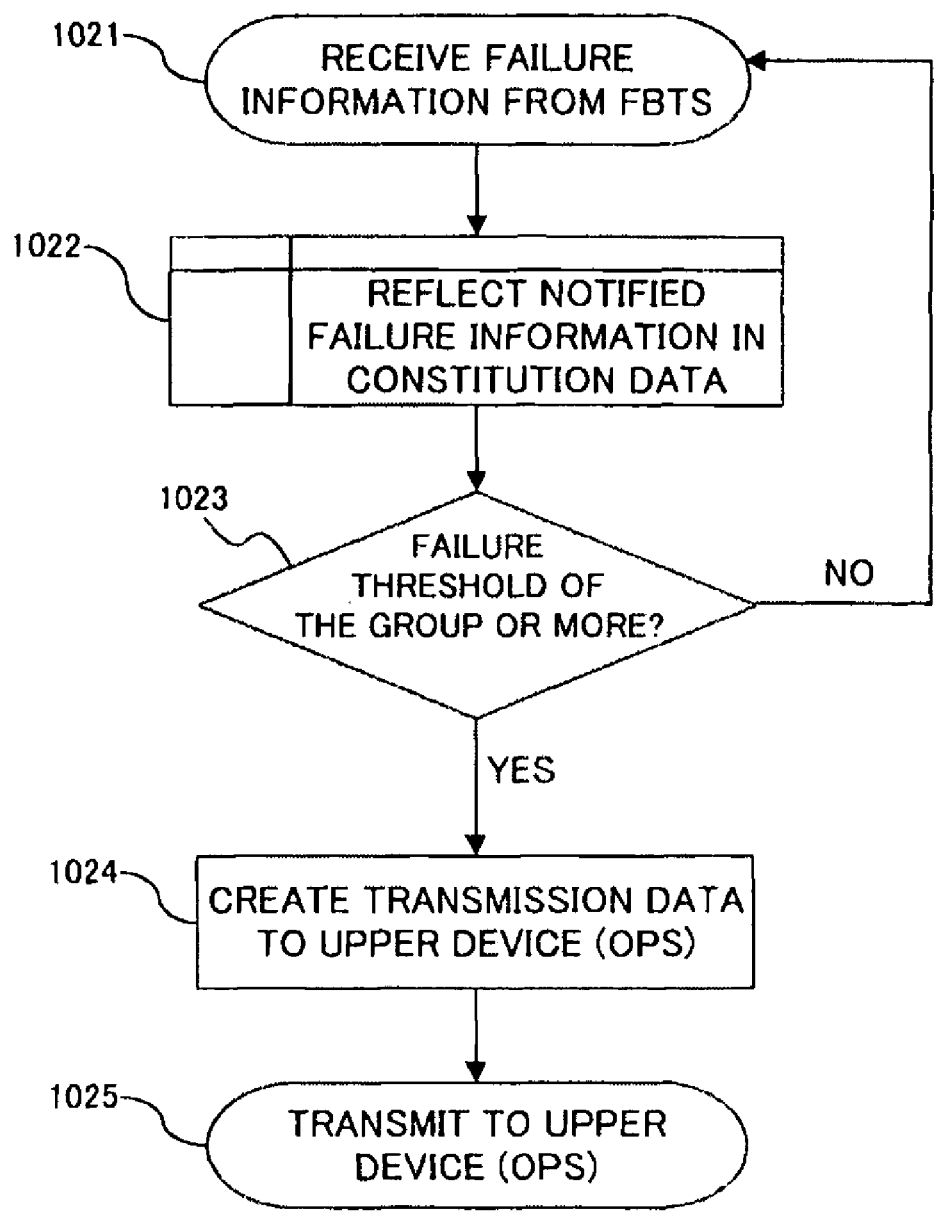
FIG. 10 is a flow chart for use in describing one example of the failure notification processing in the system illustrated in FIG. 1.

9), and the data control unit 34 reflects the contents of the received message (failure information) in the constitution data by apparatuses (the processing 1005 in FIG. 9 and the processing 1022 in FIG. 10). One example of the above will be illustrated in the following table 3.

TABLE 3

Constitution Data by Apparatuses

| Apparatus Number | Group Number | IP Address | State of Apparatus | ... |
|---|---|---|---|---|
| femtocell BTS#1 | #1 | xx.xx.xx.xx | Failure | ... |
| femtocell BTS#2 | #1 | yy.yy.yy.yy | Normal→Failure | ... |
| femtocell BTS#3 | #1 | zz.zz.zz.zz | Normal | ... |
| femtocell BTS#4 | #2 | ... | ... | ... |
| ... | ... | ... | ... | ... |
| femtocell BTS#m | #n | ... | ... | ... |

The data control unit 34 updates the failure rate of the constitution data by groups, according to the failure information reflected in the constitution data by apparatuses, and compares the failure rate and the threshold of failure in the updated constitution data by groups (the processing 1023 in FIG. 10).

Because when the FBTS 40-j is set at each house for home user and a failure occurs in any one apparatus at a house, the house is seriously affected by the failure such as a failure of communication, the threshold of failure may be set lower.

On the other hand, when the FBTSs 40-j are set, for example, at a place where unspecified users are supposed to use it, such as an amusement center, office center, and public facility, since even when one has a failure, it can be replaced with the other FBTS 40-j, the threshold of failure can be set higher.

Thus, the threshold of failure can be set in every setting area of the FBTS 40-j. This is indicated by the information about the "setting area" in the table 2. The "setting area" may have a one-to-one correspondence with the group #k of the FBTSs 40-j or it may be set independently of the group #k.

In the embodiment, the threshold of failure is set ⅔ and the failure rate of the group #1 before failure of the FBTS #2 is set ⅓. The data control unit 34 recognizes that the FBTS #2 having a failure belongs to the group #1, according to the constitution data by apparatuses, and it updates the failure rate in the constitution data by groups from ⅓ to ⅔, as illustrated in the table 4. As a result, since the failure rate becomes the threshold of failure or more, it determines that a failure notification is necessary (YES route in the processing 1023 in FIG. 10), and notifies the failure monitoring processor 363 of the determination (the processing 1006 in FIG. 9).

TABLE 4

Constitution Data by Groups

| Group Number | Failure Rate | Threshold of Failure Occurrence | ... |
|---|---|---|---|
| Group #1 | ⅓→⅔ | Notify at ⅔ failure | ... |
| Group #2 | ... | Notify at XX failure | ... |

TABLE 4-continued

Constitution Data by Groups

| Group Number | Failure Rate | Threshold of Failure Occurrence | ... |
|---|---|---|---|
| Group #3 | ... | Notify at YY failure | ... |
| ... | ... | ... | ... |
| Group #n | ... | ... | ... |

By receiving the notification, the failure monitoring processor 363 creates a failure notification message including failure information destined for the OPS 70 and transmits it to the OPS 70 through the inter-RNC interface 31 (the processing 1007 to the processing 1010 in FIG. 9 and the processing 1024 and the processing 1025 in FIG. 10). This notification (message) can be transmitted using the existing signal format for use in a communication with the RNC 20. One example of this is illustrated in FIG. 8.

Figure 8:
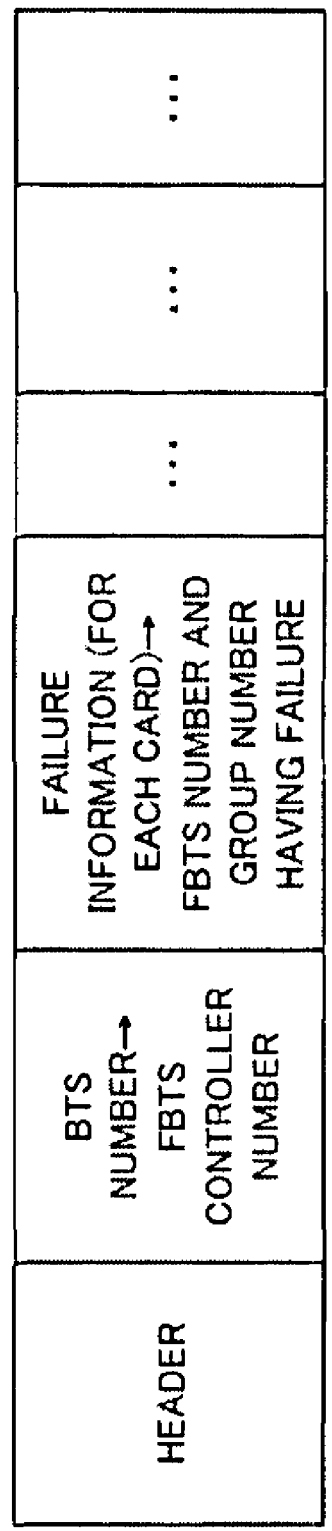
FIG. 8 is a view illustrating a format example of a failure notification message from the FBTS controller to the RNC illustrated in FIG. 1.

In FIG. 8, the existing signal format includes a header field, a BTS number field, a failure information field, and the other data field. In the header field, the type of a message (a notification message of the failure information and the like) can be set; in the BTS number field, the apparatus number of a notification source (existing BTS) can be set. In the failure information field, the failure information of the existing BTS can be set in every predetermined inner unit (also referred to as card).

In this signal format, for example, the apparatus number of the FBTS controller 30-i is set in the BTS number field, and the apparatus number of the FBTS 40-j and the group number to which the FBTS 40-j belongs are set in the failure information field, hence to make it possible to notify the RNC 20 which FBTS 40-j belonging to which group #k under the control of which FBTS controller 30-i has a failure, by using the existing signal format. It is, for example, the data converter 360 that creates a notification message of this kind of signal format. When a change in the signal format is allowed in a communication with the RNC 20, failure information can be notified by using a signal format different from the existing signal format.

When the failure rate is less than the threshold of failure in the threshold checking processing 1023 (FIG. 10), the data control unit 34 ignores the failure notification message received from the FBTS #2 and enters a waiting state of receiving another failure notification message (NO route in the processing 1023).

Namely, even when some of the FBTSs 40-j have a failure in the group #k having the failure rate less than the threshold of failure, it is determined that the group #k has no failure. According to this, it is possible to reduce the amount of notifying the OPS 70 of the failure information about the FBTS 40-j. Therefore, it is possible to reduce the processing load in the FBTS controller 30-i, RNC 20, and OPS 70.

The threshold comparison processing 1023 is performed at a point of updating the constitution data by groups as one example. Alternatively, it may be performed periodically independently of update of the constitution data by groups.

(3.1.2) Case of Receiving Inquiry About Failure Situation from OPS 70

Further, an management example when the FBTS controller 30-i receives an inquiry about a failure situation from the OPS 70 will be described using FIGS. 11 to 13.

Figure 12:
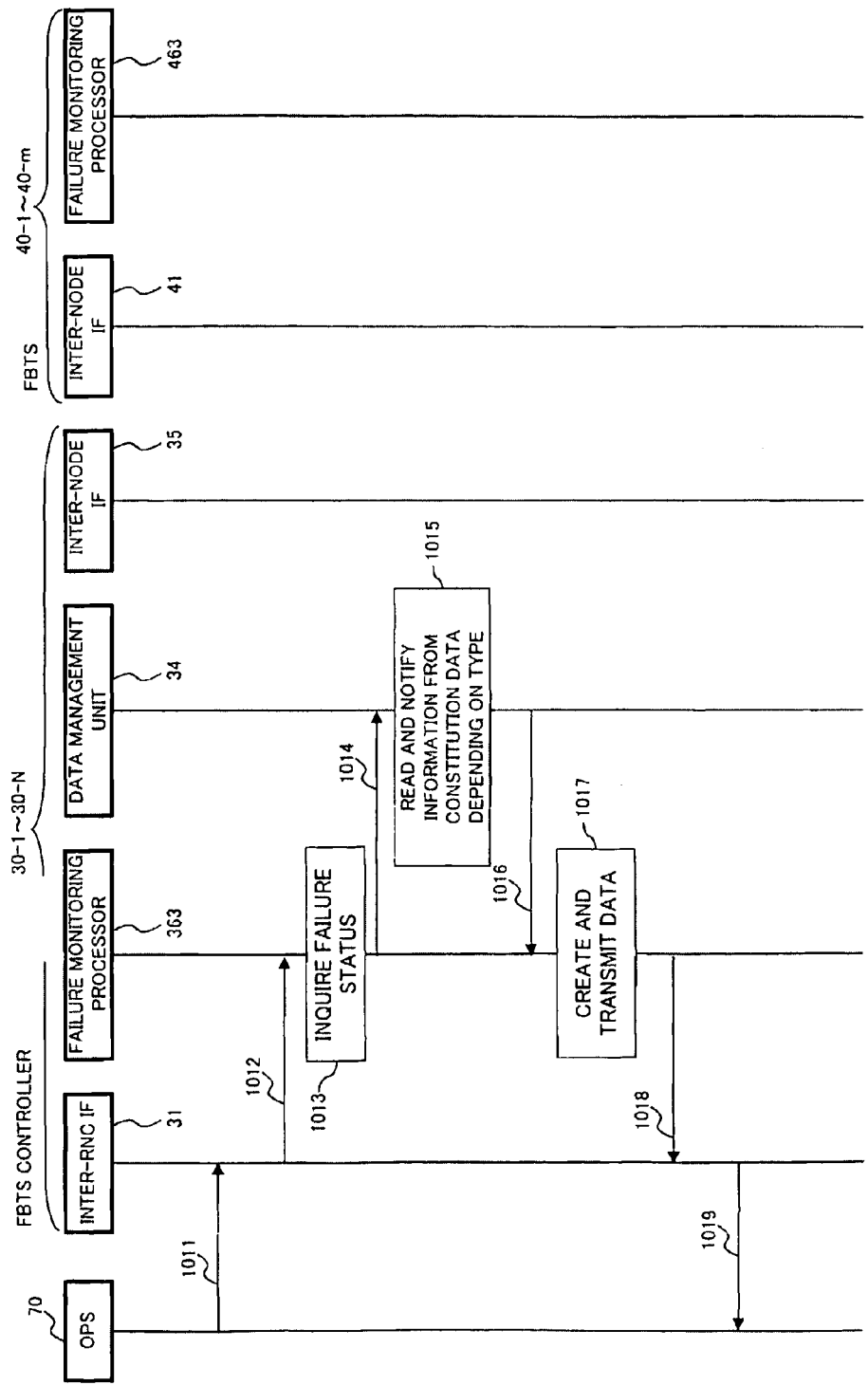
FIG. 12 is a sequence view for use in describing one example of failure information collecting processing in the system illustrated in FIG. 1.

In the FBTS controller 30-i, when the inter-RNC interface 31 receives an inquiry message about the failure situation issued by the OPS 70 through the RNC 20 (the processing 1011 in FIG. 12 and the processing 1031 in FIG. 13), the inquiry message is transferred to the failure monitoring processor 363 (the processing 1012 in FIG. 12).

Figure 11:
FIG. 11 is a view illustrating a format example of a message of inquiring a failure status of the FBTS controller from the OPS illustrated in FIG. 1.

One example of the signal format of the inquiry message is illustrated in FIG. 11. This signal format includes a header field, a BTS type field, and the other data field. In the header field, information (IP address and the like) indicating the source and destination of the signal and the type of the signal (message) (message of inquiry about failure situation and the like) can be set.

Therefore, the inter-RNC interface 31 can recognize that the received signal (message) is a message of inquiry about a failure situation from the OPS 70, with reference to the setting information of the header field, and transfer the message to the failure monitoring processor 363.

In the BTS type field, information indicating whether a target for inquiry about a failure situation is the FBTS controller 30-$i$ or the FBTS 40-$j$ can be set.

Figure 13:
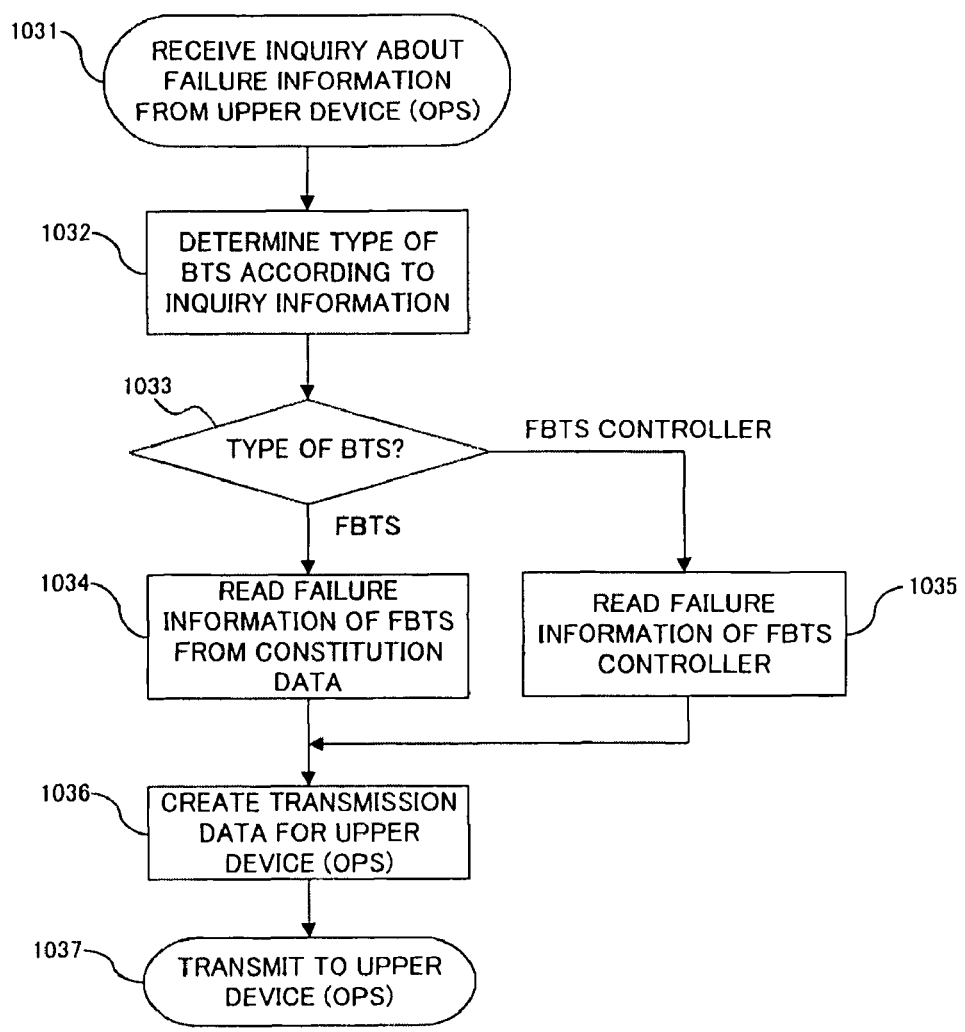
FIG. 13 is a flow chart for use in describing one example of the failure information collecting processing in the system illustrated in FIG. 1.

When receiving the inquiry message from the inter-RNC interface 31, the failure monitoring processor 363 can determine (distinguish) whether the OPS 70 is requesting the information on a failure situation (failure information) about the subject station (FBTS controller) 30-$i$ or the failure information about the subordinate FBTS 40-$j$, referring to the setting information in the BTS type field (the processing 1032 and the processing 1033 in FIG. 13).

As a result, when the "BTS type" is "FBTS", the failure monitoring processor 363 inquires the current failure situation (failure information) about the FBTS 40-$j$ of the data control unit 34, and when the "BTS type" is "FBTS controller", it inquires the current failure situation about the subject station (FBTS controller 30-$i$) of the data control unit 34 (the processing 1013 and the processing 1014 in FIG. 12).

The data control unit 34 obtains the failure information depending on the inquiry (namely, depending on the BTS type) from the constitution data by apparatuses and/or the constitution data by groups, or the failure information of the subject station 30-$i$, and notifies it to the failure monitoring processor 363 (the processing 1015 and the processing 1016 in FIG. 12, and the processing 1034 and the processing 1035 in FIG. 13).

The failure monitoring processor 363 creates a response message to the inquiry message, as one example of a signal including the notified failure information, and transmits the response message to the OPS 70 through the inter-RNC interface 31 (the processing 1017 to the processing 1019 in FIG. 12, and the processing 1036 and the processing 1037 in FIG. 13). The response message also can adopt the signal format illustrated in FIG. 8.

(3.2) Congestion Processing

This time, an example of the processing in which the FBTS controller 30-$i$ monitors (detects) and controls a congestion in the FBTS 40-$j$ in every group #k will described using FIGS. 14 to 17.

For example, the following two methods are considered as a method that the FBTS controller 30-$i$ recognizes the congestion in the FBTS 40-$j$. As a first method, there is a method of receiving a notification of the information on the congestion detected by the subordinate FBTS 40-$j$, from this FBTS 40-$j$ itself. As a second method, there is a method of autonomously detecting the congestion by the FBTS controller 30-$i$ monitoring a communication traffic with the subordinate FBTS 40-$j$. Hereinafter, an management example based on these two methods will be described individually in separate sections.

(3.2.1) First Method (Detecting Congestion in FBTS)

As one example, the case where the traffic amount of the group #1 which the FBTS #1 belongs to exceeds the threshold of congestion in the group #1, according to an increase of the traffic amount in the FBTS 40-1 (#1), will be described.

Figure 14:
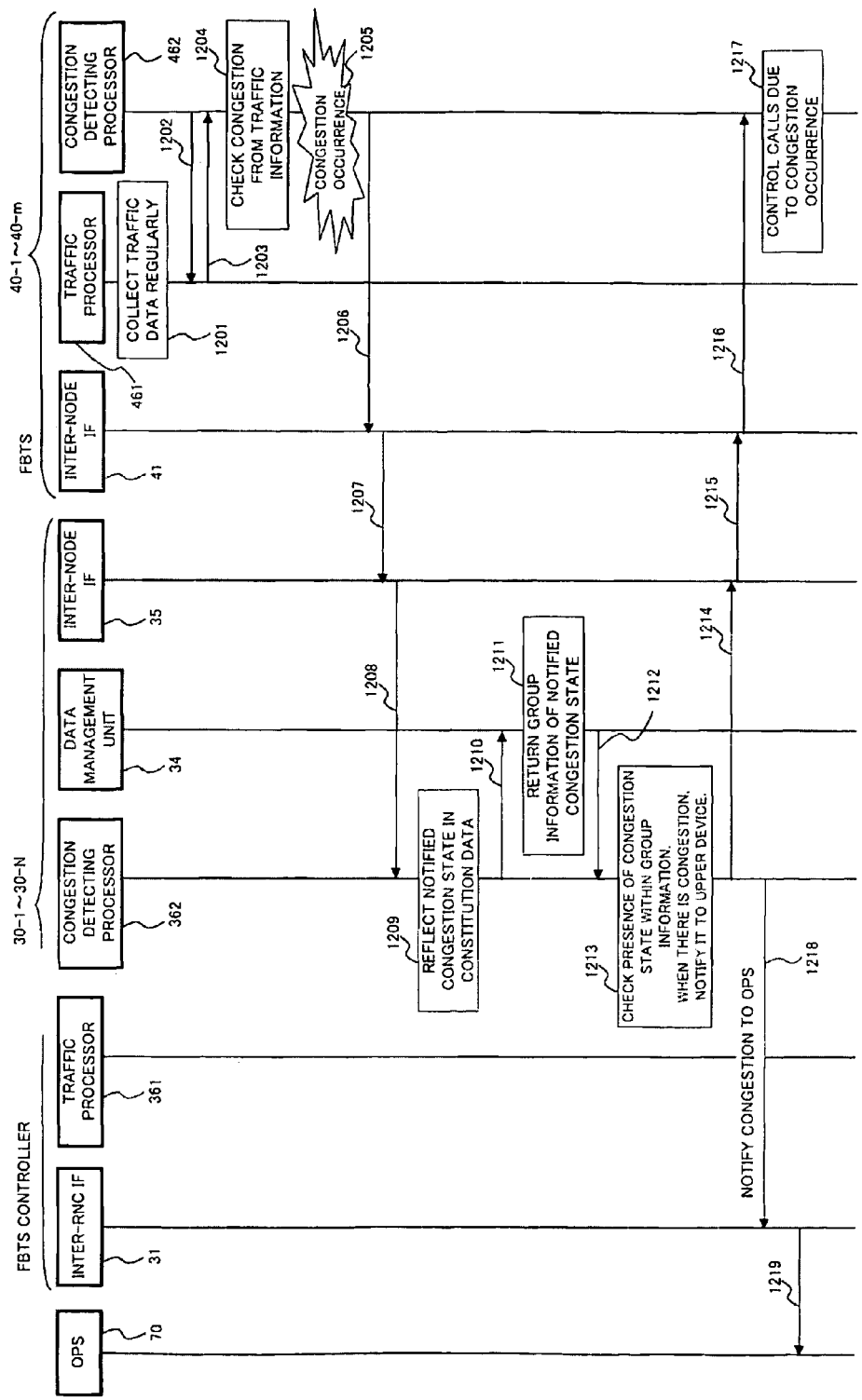
FIG. 14 is a sequence view for use in describing one example of the congestion detecting processing in the system illustrated in FIG. 1.

As illustrated in FIG. 14, the FBTS 40-$j$ collects traffic data (the number of calls per unit time) through the traffic processor 461 monitoring call processing (the processing 1201). The monitoring and collecting timing can be set, for example, as a regular (periodic) timing.

The congestion detecting processor 462 compares the traffic data collected by the traffic processor 461 with a predetermined threshold (threshold of congestion) set in ever group #k, to confirm the congestion (the processing 1202 to the processing 1204).

Here, the threshold of congestion can be set in every group #k of the FBTSs 40-$j$, similarly to the threshold of failure. For example, when the grouping is performed in every setting area and the FBTS 40-$j$ is set at each house for home user, even if some of the FBTSs 40-$j$ enter the congestion, a probability of the whole group #k that the corresponding FBTS 40-$j$ belongs to entering the congestion is considered low. Then, the threshold of congestion can be set higher.

On the contrary, when the FBTSs 40-$j$ are set, for example, at a place where unspecified users are supposed to use them such as a town center, office center, and public facility and many unspecified users are gathered together in an area where some event such as a festival is held, when some of the FBTSs 40-$j$ belonging to the same area (group #k) enter the congestion, a probability of the other FBTSs 40-$j$ entering the congestion is considered high. Then, the threshold of congestion may be set lower.

As a result of the threshold comparison, when the traffic amount is equal to the threshold of congestion or more and congestion is determined to have occurred, the congestion detecting processor 462 notifies the FBTS controller 30-$i$ of the occurrence of congestion, via the inter-node IF 41 (the processing 1205 to the processing 1207). This notification can be performed, for example, by using the existing signal format for use in a communication between the existing BTS and RNC 20.

Figure 15:
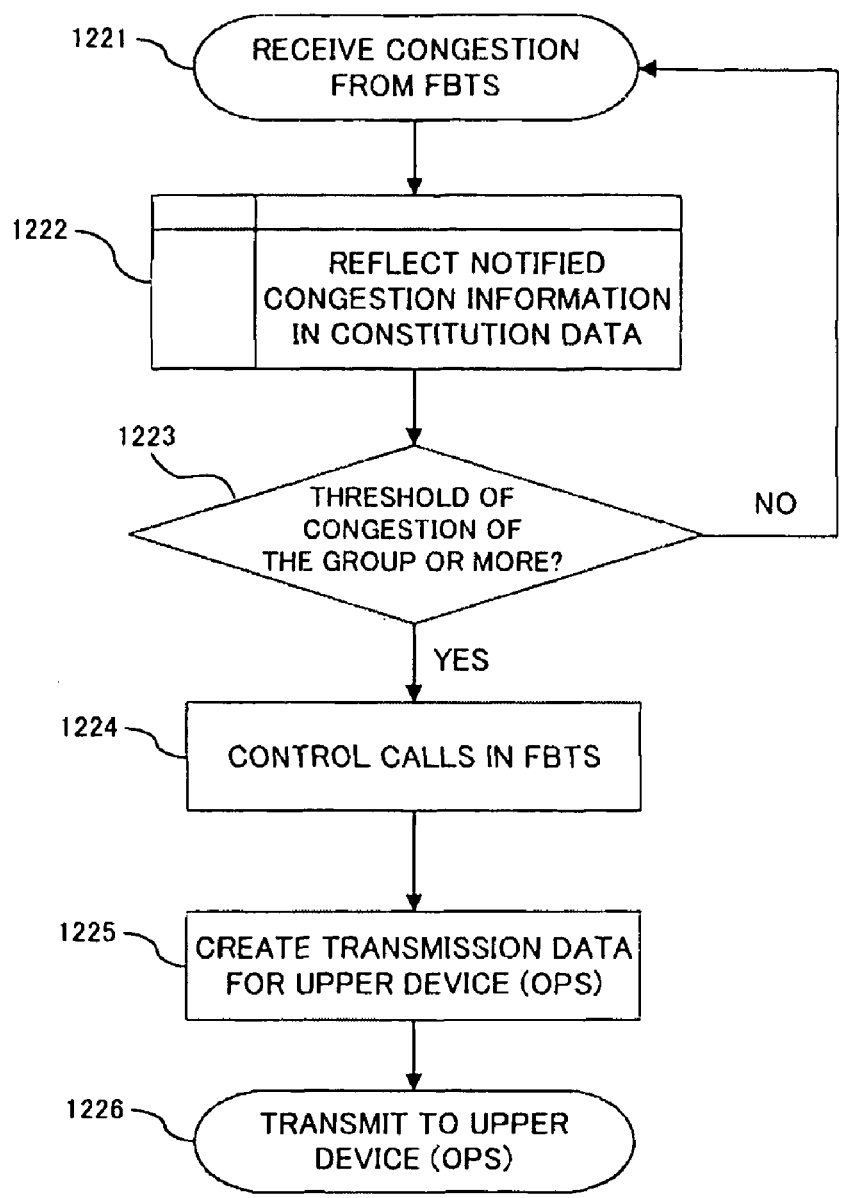
FIG. 15 is a flow chart for use in describing one example of the congestion detecting processing in the system illustrated in FIG. 1.

The notification is received by the inter-node IF 35 of the FBTS controller 30-$i$ and transferred to the congestion detecting processor 362 (the processing 1208 in FIG. 14 and the processing 1221 in FIG. 15). The congestion detecting processor 362 reflects the notified congestion (occurrence of congestion) in the constitution data by apparatuses of the data control unit 34 (the processing 1209 and the processing 1210 in FIG. 14 and the processing 1222 in FIG. 15). One example of the above is illustrated in the following table 5.

TABLE 5

Constitution Data by Apparatuses

| Apparatus Number | Group Number | ... | Traffic Amount | Congestion | ... |
|---|---|---|---|---|---|
| femtocell BTS#1 | #1 | ... | 10→15 | OFF→ON | ... |
| femtocell BTS#2 | #1 | ... | 10 | OFF | ... |
| femtocell BTS#3 | #2 | ... | 6 | OFF | ... |
| ... | ... | ... | ... | ... | ... |
| femtocell BTS#m | ... | ... | ... | ... | ... |

This table 5 indicates that the traffic amount of the FBTS #1 belonging to the group #1 is updated from 10 to 15 and that the congestion is updated from OFF to ON.

Further, the data control unit 34 updates the contents of the constitution data by groups according to the above updates. One example of the above is illustrated in the table 6.

TABLE 6

Constitution Data by Groups

| Group Number | Traffic Amount | Threshold of Congestion | Threshold of Recovery from Congestion | Area | ... |
|---|---|---|---|---|---|
| Group #1 | 20→25(15 + 10) | Notify at 25 or more | Recover at 15 or less (no congestion) | A | ... |
| Group #2 | ... | Notify at XX or more | Recover at YY or less | B | ... |
| Group #3 | ... | Notify at XX or more | Recovery at YY or less | B | ... |
| ... | ... | ... | ... | ... | ... |
| Group #n | ... | ... | ... | ... | ... |

This table 6 indicates that the traffic amount of the group #1 is updated from 20 to 25 according to an increase (10→15) of the traffic amount in the FBTS #1.

Then, the data control unit 34 notifies the congestion detecting processor 362 of the group number involved in the above update of the constitution data (the processing 1211 and the processing 1212 in FIG. 14), and then the congestion detecting processor 362 determines whether or not to notify the OPS 70 of the congestion, based on the group number notified by the data control unit 34, referring to the constitution data by groups.

Namely, the congestion detecting processor 362 checks whether or not there is a group #k in which the traffic amount is equal to the threshold of congestion (in this example, for example, 25) or more (the processing 1213 in FIG. 14 and the processing 1223 in FIG. 15), by comparison between the traffic amount and the threshold of congestion in every group #k.

As a result, when there is the group #k (in this example, the group #1) in which the traffic amount is equal to the threshold of congestion or more, the congestion detecting processor 362 notifies the respective FBTSs 40-j belonging to the group #k that they should restrain calls (the processing 1214 to the processing 1216 in FIG. 14 and the processing 1224 in the YES route from the processing 1223 in FIG. 15).

By receiving this notice, each of the FBTSs 40-j (congestion detecting processors 462) controls the call processing so as to restrain the calls in a communication with the subordinate wireless terminal 50 (the processing 1217 in FIG. 14).

The congestion detecting processor 362 of the FBTS controller 30-i additionally or alternatively notifies the OPS 70 of the congestion of the group #k determined to have congestion (the processing 1218 and the processing 1219 in FIG. 14 and the processing 1224 to the processing 1226 in FIG. 15). At that time, the congestion detecting processor 362 can notify the OPS 70 of the area information corresponding to the group number #k together.

The area information may conform to a unit of carrier/sector, for example, as a unit that can be noticed to the existing BTS. This area information can be included in the station data and administered, for example, by the data control unit 34, and it can be reflected in the constitution data from the station data at a time of activation/resuming and at a time of updating the station data.

In the threshold comparison processing 1223 (in FIG. 15), when the traffic amount is less than the threshold of congestion, the congestion detecting processor 362 enters a waiting state of receiving another congestion notification (NO route in the processing 1223).

Namely, determining that the group #k is not in the congestion (no congestion occurred) unless the traffic amount is equal to the threshold of congestion or more in every group #k, the congestion detecting processor 362 performs neither call control on the corresponding group #k nor notification of the congestion to the OPS 70. Thus, it is possible to reduce the load for the call control in the FBTS 40-j and the notification amount to the OPS 70 of the congestion in the respective FBTSs 40-j. Therefore, processing load can be reduced in the FBTS controller 30-i, RNC 20, and the OPS 70.

When the congestion in the FBTS 40-j is recovered, this is notified to the FBTS controller 30-i, the constitution data by apparatuses and the constitution data by groups are updated similarly to the case of occurrence of congestion, and by comparison with the threshold of recovery from congestion in every group #k, recovery of the congestion is checked in every group #k. As for the group #k that is recovered from the congestion, this can be notified to the FBTS 40-j belonging to the same group #k and the OPS 70. Further, the call control as for the group #k can be released.

(3.2.2) Second Method (Detecting Congestion in FBTS Controller)

Next, as an example of the second method, the case where the FBTS controller 30-i determines that congestion occurs in the group #1, according to the traffic amount notified from the subordinate FBTS 40-1 (#1) will be described using FIG. 16 and FIG. 17.

Figure 16:
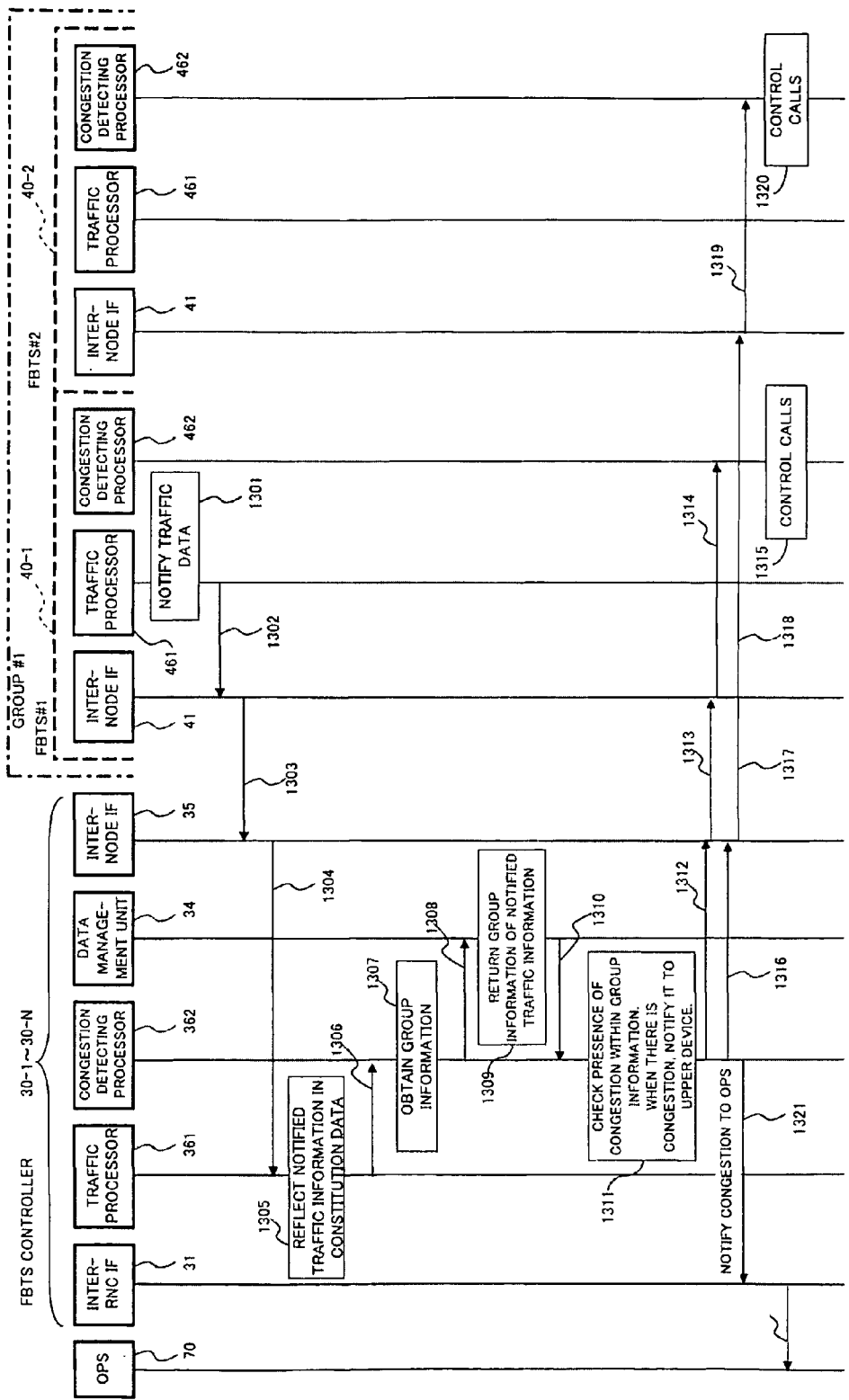
FIG. 16 is a sequence view for use in describing one example of the congestion detecting processing in the system illustrated in FIG. 1.

As illustrated in FIG. 16, the FBTS 40-1 collects traffic data in the traffic processor 461 and notifies the FBTS controller 30-i of the collected traffic data via the inter-node IF 41 (the processing 1301 to the processing 1303). A timing of collecting and notifying the traffic data can be set as a periodical timing.

Figure 17:
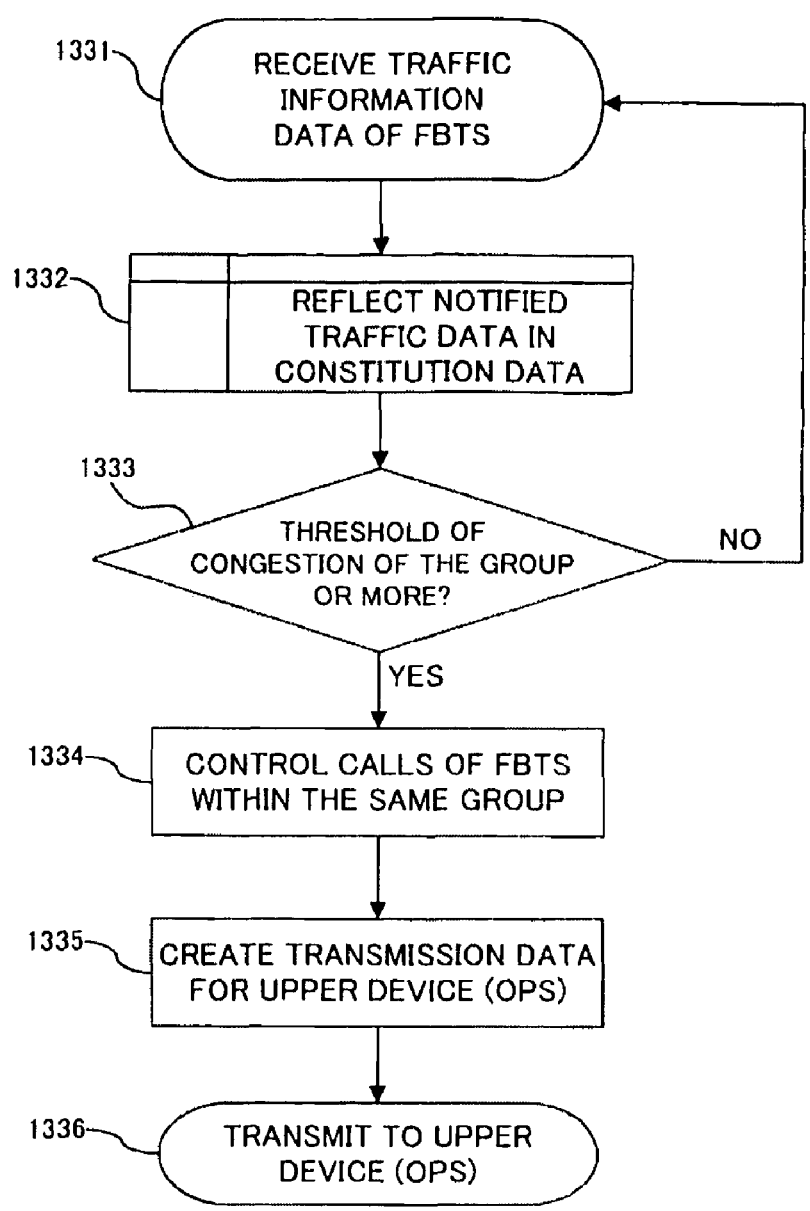
FIG. 17 is a flow chart for use in describing one example of the congestion detecting processing in the system illustrated in FIG. 1.

The notification is received by the inter-node IF 35 of the FBTS controller 30-i, and transferred to the traffic processor 361 (the processing 1304, and the processing 1331 in FIG. 17). The traffic processor 361 reflects the notified traffic data in the constitution data by apparatuses in the data control unit 34 (the processing 1305 in FIG. 16 and the processing 1332 in FIG. 17). One example of this is illustrated in the following table 7.

TABLE 7

Constitution Data by Apparatuses

| Apparatus Number | Group Number | ... | Traffic Amount | Congestion | ... |
|---|---|---|---|---|---|
| femtocell BTS#1 | #1 | ... | 10 | OFF | |
| femtocell BTS#2 | #1 | ... | 10→15 | OFF | |
| Microminiature BTS#3 | #2 | ... | 6 | OFF | |
| ... | ... | ... | ... | ... | |
| femtocell BTS#m | ... | ... | ... | ... | |

This table 7 indicates that the traffic amount of the FBTS #2 belonging to the group #1 is updated from 10 to 15.

Further, the data control unit 34 updates the constitution data by groups according to the above updates. One example of the above is illustrated in the following table 8.

TABLE 8

Constitution Data by Groups

| Group Number | Traffic Amount | Threshold of Congestion | Threshold of Recovery from Congestion | Area | ... |
|---|---|---|---|---|---|
| Group #1 | 20→25(10 + 15) | Notify at 25 or more | Recover at 15 or less (no congestion) | A | ... |
| Group #2 | ... | Notify at XX or more | Recover at YY or less | B | ... |
| Group #3 | ... | Notify at XX or more | Recover at YY or less | B | ... |
| ... | ... | ... | ... | ... | ... |
| Group #n | ... | ... | ... | ... | ... |

This table 8 illustrates that the traffic amount of the group #1 is updated from 20 to 25, according to an increase (10→15) in the traffic amount in the FBTS #2.

The traffic processor 361 notifies the congestion detecting processor 362 of the above update (the processing 1306 in FIG. 16), and the congestion detecting processor 362 obtains the group number and traffic amount updated in the constitution data by groups by the data control unit 34 and the threshold of congestion (the processing 1306 to the processing 1310 in FIG. 16).

By comparison between the obtained traffic amount of the group #k (in this example, k=1) and the threshold of congestion, the congestion detecting processor 362 checks whether or not the traffic amount is equal to the threshold of congestion (in this example, for example, 25) or more (the processing 1311 in FIG. 16 and the processing 1333 in FIG. 17). As a result, when the traffic amount of the group #1 is equal to the threshold of congestion or more, the congestion detecting processor 362 determines that congestion has occurred in the group #1 and notifies the respective FBTSs 40-*j* (in this example, for example, the FBTSs #1 and #2) belonging to the group #1 that they should control calls (the processing 1312 to the processing 1314 and the processing 1316 to the processing 1319 in FIG. 16, and the processing 1334 in the YES route from the processing 1333 in FIG. 17).

By receiving this notice, the respective FBTS #1 and #2 (congestion detecting processors 462) belonging to the group #1 control call processing so as to restrain the calls in a communication with the subordinate wireless terminal 50 (the processing 1315 and the processing 1320 in FIG. 16).

The congestion detecting processor 362 of the FBTS controller 30-*i* additionally or alternatively notifies the OPS 70 of the congestion corresponding to the group #1 determined to have congestion (the processing 1321 and the processing 1322 in FIG. 16 and the processing 1335 and the processing 1336 in FIG. 17). At that time, the congestion detecting processor 362 can notify the OPS 70 of the area information corresponding to the group #1 together.

Further, the congestion detecting processor 362 updates the respective states of congestion in the FBTS #1 and #2 belonging to the group #1 in the constitution data by apparatuses to ON. One example of this is illustrated in the following table 9.

TABLE 9

Constitution Data by Apparatuses

| Apparatus Number | Group Number | ... | Traffic Amount | Congestion | ... |
|---|---|---|---|---|---|
| femtocell BTS#1 | #1 | ... | 10 | OFF→ON | ... |
| femtocell BTS#2 | #1 | ... | 10→15 | OFF→ON | ... |
| femtocell BTS#3 | #2 | ... | 6 | OFF | ... |
| ... | ... | ... | ... | ... | ... |
| femtocell BTS#m | #n | ... | ... | ... | ... |

In the threshold checking processing 1333, when the traffic amount in every group #k is less than the threshold of congestion, determining that no congestion has occurred in the group #k, the congestion detecting processor 362 enters a waiting state of receiving another traffic data (NO route in the processing 1333).

As for the group #k where the traffic amount is less than the threshold of congestion, even when some of the FBTSs 40-*j* enter the congestion, it is determined that the group #k has no congestion. According to this, it is possible to reduce the notification amount to the OPS 70 of the congestion in the respective FBTSs 40-*j*. Therefore, it is possible to reduce the processing load in the FBTS controller 30-*i*, RNC 20, and OPS 70.

(3.3) File Management

This time, processing of performing a file management on various kinds of data and files such as station data, constitution data, program file, and setting file possessed by the FBTS controller 30-*i* and the FBTS 40-*j* will be described.

A master file of the station data, constitution data, program file, and setting file used by the FBTS 40-*j* and the FBTS controller 30-*i* (hereinafter, referred to as "file" simply) is stored, for example, in each file server of the OPS 70 and the CN 10.

A file management function is a function of downloading and updating each file that has been updated according to an management from the OPS 70 and the CN 10, or autonomously downloading and updating each file even without any management from the CN 10, when there is a change in these files. In updating each file, it is preferable that synchronization is established between the FBTSs 40-*j* and between the FBTS 40-*j* and the FBTS controller 30-*i*.

In this embodiment, the above file management is enabled, by way of example, by the file management processor 364 in the FBTS controller 30-*i* and by the file management processor 464 in the FBTS 40-*j*. In the following description, assume that the master file is stored in a file server present in the CN 10 as an example.

(3.3.1) File Updating According to Management from CN 10

One example of file updating according to an management from the CN 10 will be described using FIGS. 18 to 21. A file update target maybe sometimes the FBTS controller 30-*i* and other times its subordinate FBTS 40-*j* and the both cases will be individually described in separate sections.

(3.3.1.1) File Update Processing in FBTS Controller 30-*i*

The FBTS controller 30-*i* downloads a file according to an management from the CN 10. The file is received by the file management processor 364 via the inter-RNC interface 31 and transferred to the data control unit 34 (the processing 1401 to the processing 1403 in FIG. 18 and the processing 1461 in FIG. 20). The data control unit 34 stores the transferred file and notifies the file management processor 364 that the file has been stored (the processing 1404 and the processing 1405 in FIG. 18).

Figure 18:
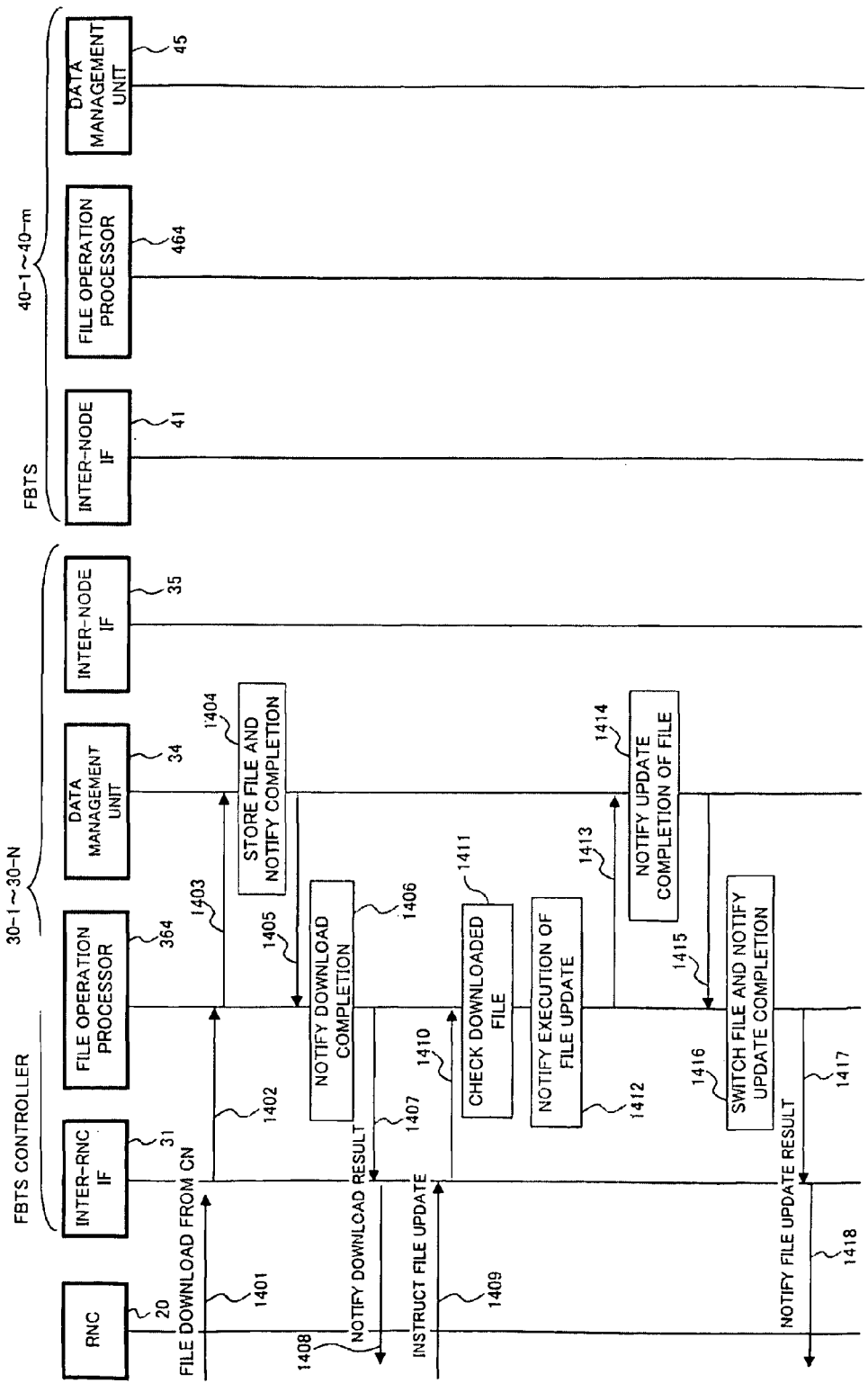
FIG. 18 is a sequence view for use in describing one example of the file update processing for the FBTS controller illustrated in FIG. 1.

By receiving the above notification from the data control unit 34, the file management processor 364 notifies the CN 10 (file server) that the file has been downloaded (the processing 1406 to the processing 1408 in FIG. 18).

Figure 20:
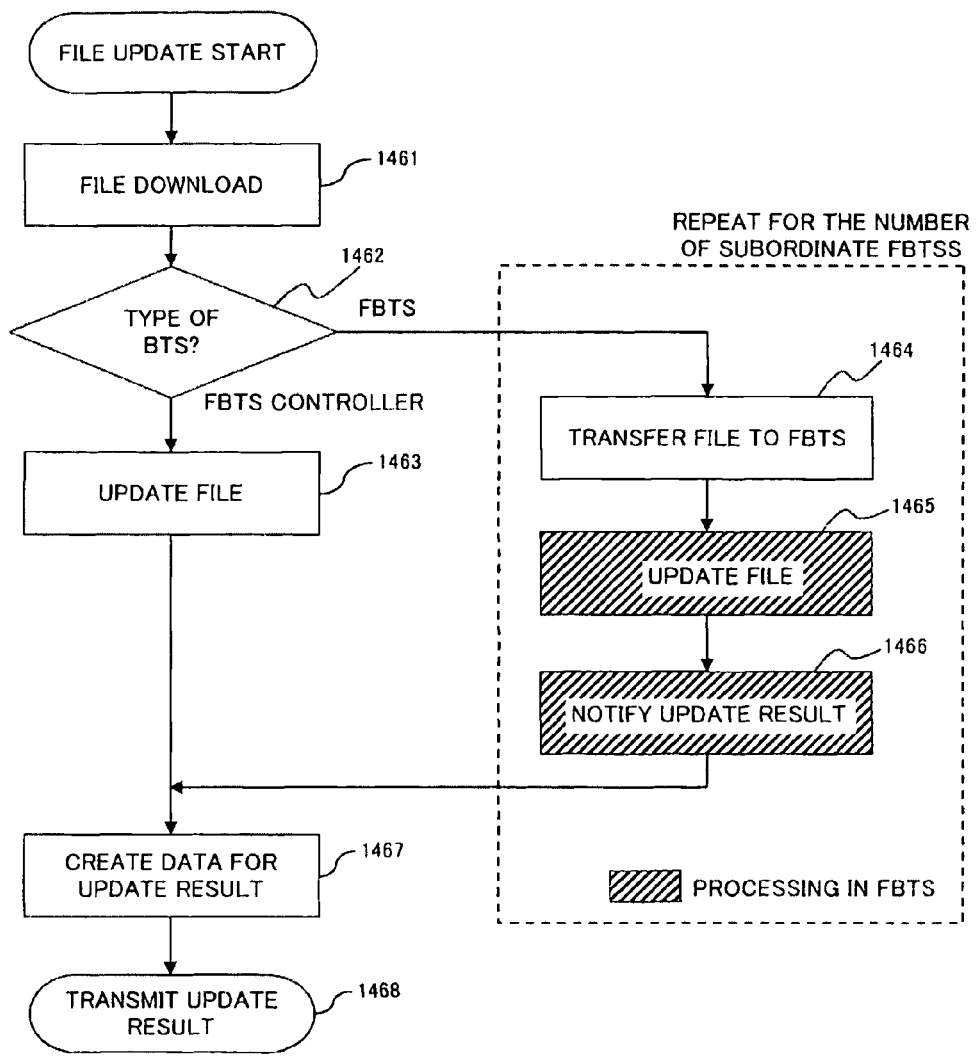
FIG. 20 is a flow chart for use in describing one example of the file update processing in the system illustrated in FIG. 1.
Figure 21:
FIG. 21 is a view illustrating a format example of the file downloaded by the FBTS controller illustrated in FIG. 1.

Then, when the file management processor 364 receives a file update instruction from the CN 10 (file server) via the inter-RNC interface 31 (the processing 1409 and the processing 1410 in FIG. 18), the file management processor 364 checks whether the downloaded file is a file destined for the FBTS controller 30-$i$ or a file destined for the FBTS 40-$j$ (the processing 1411 in FIG. 18 and the processing 1462 in FIG. 20). This check can be performed, for example, based on the information (file name+file identifier) illustrated in the file header, as illustrated in FIG. 21.

For example, when the information illustrated in the file header is "xxxxxyyy.XYZ", the portion "xxxxx" of the file name "xxxxxyyy" indicates the number of the upper apparatus and the portion "yyy" indicates the apparatus number of the FBTS controller 30-$i$ or FBTS 40-$j$. In this example, the file management processor 364 can perform the above check, referring to the portion "yyy".

The ".XYZ" following the file name is a file identifier and, for example, X can indicate the type of apparatus; Y, the model number; and Z, the type of maker. As one example, when X=B, it indicates the existing BTS; when X=C, it indicates the station data of the FBTS controller 30-$i$; when X=D, it indicates the station data of the FBTS 40-$j$; when X=E, it indicates a program of the FBTS controller 30-$i$; when X=F, it indicates a program of the FBTS 40-$j$ respectively. When Y=1, it indicates the latest apparatus and when Y=2, it indicates the older apparatus. Further, when Z=F, it indicates the type of maker is FUJITSU.

As a result of the above check, for example, when the downloaded file is a file destined for the FBTS controller 30-$i$, the file management processor 364 notifies the data control unit 34 of file update execution (the processing 1412 and the processing 1413 in FIG. 18). By receiving the notification, the data control unit 34 updates the file (the processing 1463 in FIG. 20) and notifies the file management processor 364 that the file has been updated (the processing 1414 and the processing 1415 in FIG. 18).

In the stage where the file has been updated, an unupdated file is also stored and by executing a file switch described later, a file to be used is changed from an unupdated file to an updated file. Therefore, when there is some trouble in the updated file, a file to be used can be properly returned to the unupdated file. However, the above updating of the file is not to exclude overwriting of an unupdated file. This applied also in the following description.

By receiving the notification that the file has been updated, the file management processor 364 switches files, creates data (message) for notifying the update result when the file switch is completed, and transmits the data to the CN 10 (file server), hence to notify the CN 10 that the file has been updated (the processing 1416 to the processing 1418 in FIG. 18 and the processing 1467 and the processing 1468 in FIG. 20).

(3.3.1.2) File Update Processing of FBTS

Figure 19:
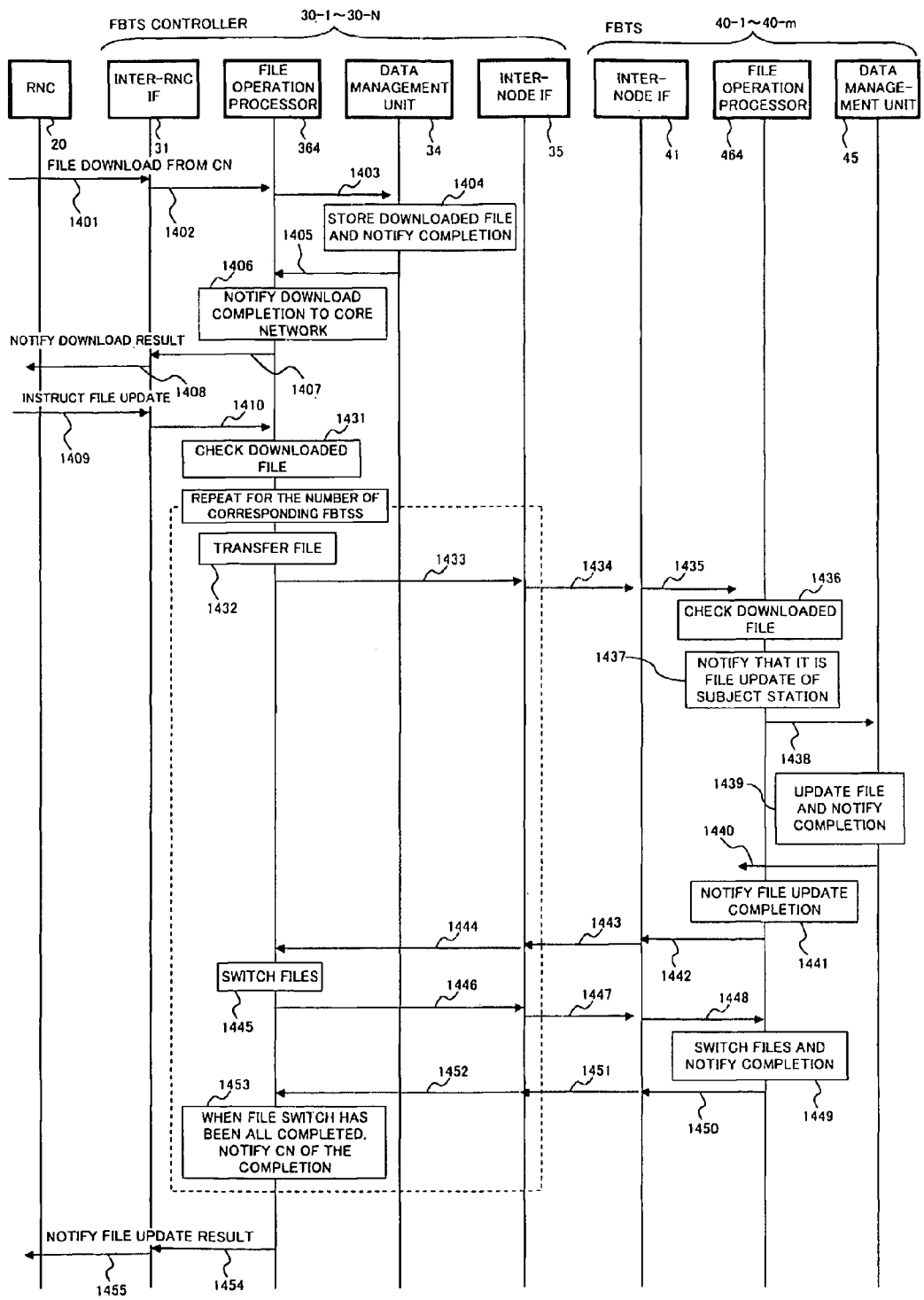
FIG. 19 is a sequence view for use in describing one example of the file update processing for the FBTS illustrated in FIG. 1.

When the downloaded file is destined for FBTS 40-$j$, in the checking processing 1462 after the download of the file (in FIG. 20), the file management processor 364 checks the type of maker of the update target apparatus and the model number, according to the information of the file header and transfers the downloaded file to the corresponding FBTS 40-$j$ (the processing 1432 to the processing 1434 in FIG. 19 and the processing 1464 in FIG. 20).

The transferred file is received by the inter-node IF 41 of the FBTS 40-$j$ and transferred to the file management processor 464 (the processing 1434 and the processing 1435 in FIG. 19). The file management processor 464 checks whether the received file is a file destined for the subject station (FBTS 40-$j$), according to the information of the file header in the received file (the processing 1436 in FIG. 19).

The file management processor 464 notifies (instructs) an update of a file for the subject station 40-$j$ to the data control unit 45 (the processing 1437 and the processing 1438 in FIG. 19). By receiving the notification, the data control unit 34 updates the file according to the file received from the FBTS controller 30-$i$ and when the above update is completed, it notifies the file management processor 464 of the completion (the processing 1439 and 1440 in FIG. 19 and the processing 1465 in FIG. 20).

By receiving the above completion notification that the file has been updated, the file management processor 464 notifies the FBTS controller 30-$i$ of the completion (the processing 1441 to the processing 1443 in FIG. 19 and the processing 1466 in FIG. 20).

In the FBTS controller 30-$i$, when the file management processor 364 receives the above completion notification from the FBTS 40-$j$ (the processing 1444 in FIG. 19), it checks whether or not update of all the files of the corresponding FBTSs 40-$j$ has been completed, for synchronization of a file switch; when all the files have been updated, it instructs the respective subordinate FBTSs 40-$j$ to switch files (the processing 1445 to the processing 1447 in FIG. 19).

In the FBTS 40-$j$, when the file management processor 464 receives the instruction of the file switch via the inter-node IF 41 (the processing 1448 in FIG. 19), the file management processor 464 switches files and notifies the FBTS controller 30-$i$ of the completion (the processing 1449 to the processing 1451 in FIG. 19).

In the FBTS controller 30-$i$, when the file management processor 364 receives the completion notification of the file switch from the FBTS 40-$j$ via the inter-node IF 35 (the processing 1452 in FIG. 19), the file management processor 364 checks whether all the files of the corresponding FBTSs 40-$j$ have been switched; when all the files have been switched, it notifies the CN 10 (file server) that all of the files have been updated (the processing 1453 to the processing 1455 in FIG. 19 and the processing 1467 and the processing 1468 in FIG. 20).

(3.3.2) Autonomous File Updating

This time, an management example of the FBTS controller 30-$i$ and the FBTS 40-$j$ autonomously updating files will be described using FIGS. 22 to 25. In the autonomous file updating, a file update target may be sometimes the FBTS controller 30-$i$ and other times its subordinate FBTS 40-$j$ and the both cases will be individually described in separate sections.

(3.3.2.1) File Update Processing in FBTS Controller 30-$i$

Figure 22:
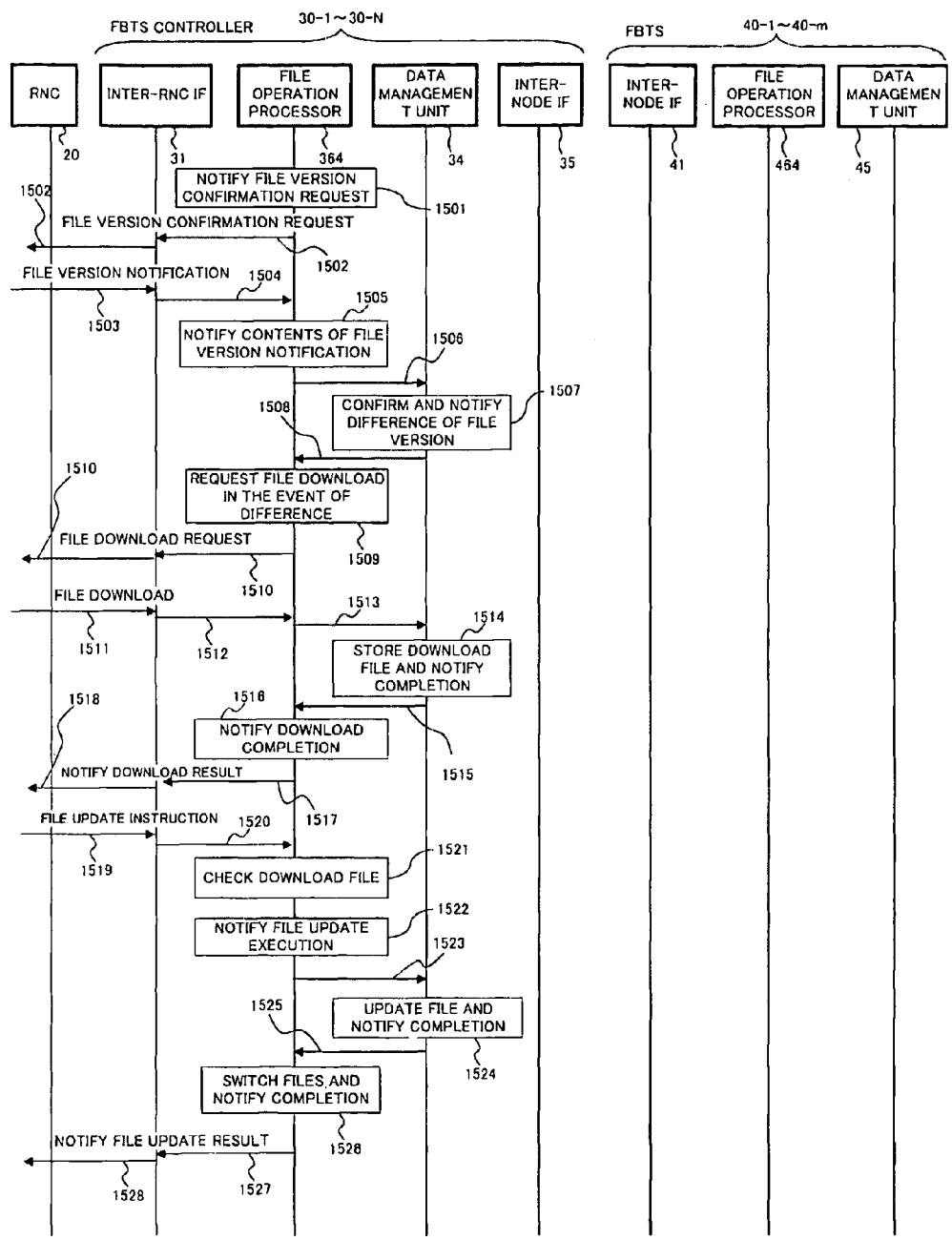
FIG. 22 is a sequence view for use in describing one example of the file update processing for the FBTS controller illustrated in FIG. 1.
Figure 25:
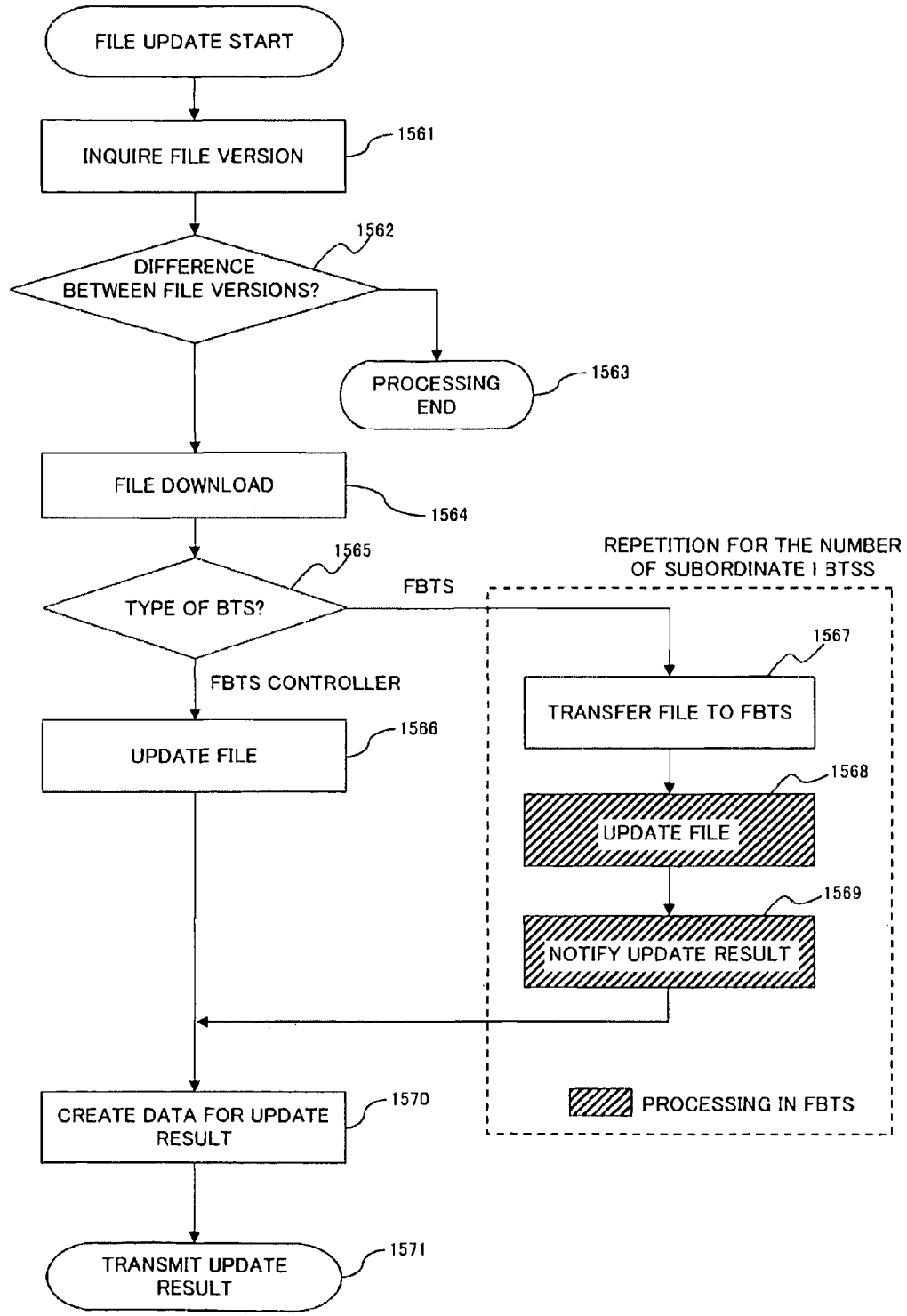
FIG. 25 is a flow chart for use in describing one example of the file update processing in the system illustrated in FIG. 1.

As illustrated in FIG. 22, the file management processor 364 of the FBTS controller 30-$i$ transmits a request (inquiry) for confirming a file version to the CN 10 (file server) at a timing (the processing 1501 and the processing 1502, and the processing 1561 in FIG. 25), and receives a response to the request (file version notification) (the processing 1503 and the processing 1504 in FIG. 22).

Figure 23:
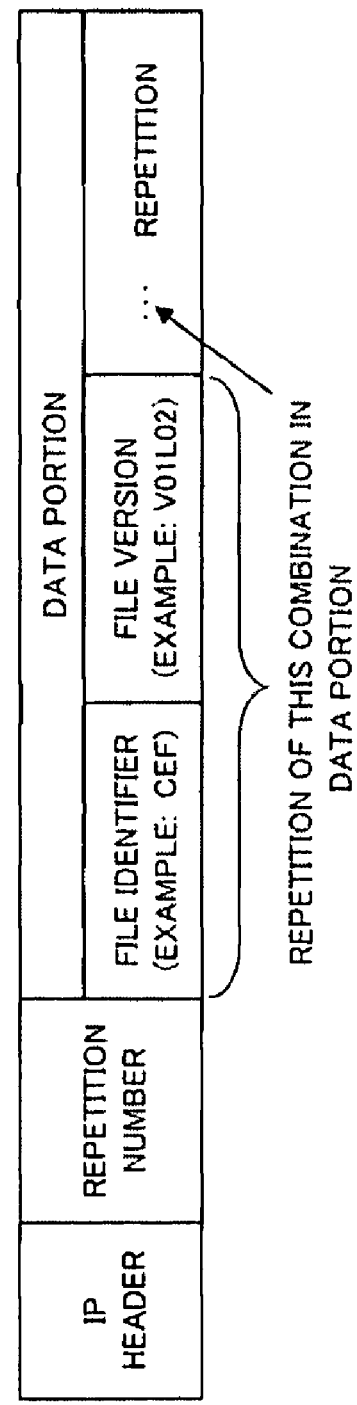
FIG. 23 is a view illustrating a signal format example used for file version notification in the system illustrated in FIG. 1.

FIG. 23 illustrates a format example of the file version notification (message). The message illustrated in FIG. 23 indicates the case of IP packet, which includes an IP header field, a field for the number of repetition, and a data portion.

In the data portion, a combination of a file identifier (.CEF) and a file version (V01L02) can be set repeatedly. The number of repeatedly setting is set in the above "repetition number" field. In the IP header field, a destination IP address and a source IP address of this message are set.

The file management processor 364 notifies the data control unit 34 of the contents of the received file version (the processing 1505 and the processing 1506 in FIG. 22). By receiving this notification, the file control unit 34 checks whether or not there is a difference between the version of the respective files administered currently and the notified file version, by comparison of the both (the processing 1562 in FIG. 25), and notifies the file management processor 364 of the result (the processing 1507 and the processing 1508 in FIG. 22).

The following table 10 illustrates one example of the version information administered by the data control unit 34 in the FBTS controller 30-*i*. The meaning of the file identifier is as described above.

TABLE 10

Version Information

| File Identifier | Version |
|---|---|
| .CEF | V01L01 |
| .DEF | V01L02 |
| .EEF | V01L02 |
| .FEF | V01L02 |

When there are no differences, the file management processor 364 finishes the processing (the processing 1563 in the NO route from the processing 1562 in FIG. 25); when there is a difference, it transmits a file download request (the processing 1509 and the processing 1510 in FIG. 22) to the CN 10 (file server), to download the file from the CN 10 (the processing 1511 and the processing 1512 in FIG. 22, and the processing 1564 in the YES route from the processing 1562 in FIG. 25). A file to be downloaded may be only a file having a difference or one or whole of the file having a difference may be downloaded.

The file management processor 364 transfers the downloaded file to the data control unit 34 (the processing 1513 in FIG. 22), and the data control unit 34 stores the transferred file and notifies the file management processor 364 that the above file has been stored (the processing 1514 and the processing 1515 in FIG. 22).

By receiving the notification, the file management processor 364 notifies the CN 10 (file server) that the file has been downloaded (the processing 1516 to the processing 1518 in FIG. 22).

Thereafter, when a file update instruction is transmitted from the CN 10 (file server) (the processing 1519 and the processing 1520 in FIG. 22), the file management processor 364 checks whether or not the downloaded file is destined for the FBTS controller 30-*i* or for the subordinate FBTS 40-*j*, according to the information of the file header in the downloaded file (the processing 1521 in FIG. 22 and the processing 1565 in FIG. 25).

As a result, when the downloaded file is a file destined for the FBTS controller 30-*i*, the file management processor 364 notifies (instructs) the data control unit 34 of file update (the processing 1522 and the processing 1523 in FIG. 22).

By receiving the file update instruction, the data control unit 34 updates files until the difference is eliminated (the processing 1566 in FIG. 25), according to the downloaded file, and it notifies the file management processor 364 of the completion when the above update has been completed (the processing 1524 and the processing 1525 in FIG. 22).

By receiving the above notification that the file update has been completed, the file management processor 364 switches files, creates data (message) for notifying update result, and transmits it to the CN 10 (file server), hence to notify the CN 10 of the completion of the file update (the processing 1526 to the processing 1528 in FIG. 22, and the processing 1570 and the processing 1571 in FIG. 25).

(3.3.2.2) File Update Processing in FBTS 40-*j*

Figure 24:
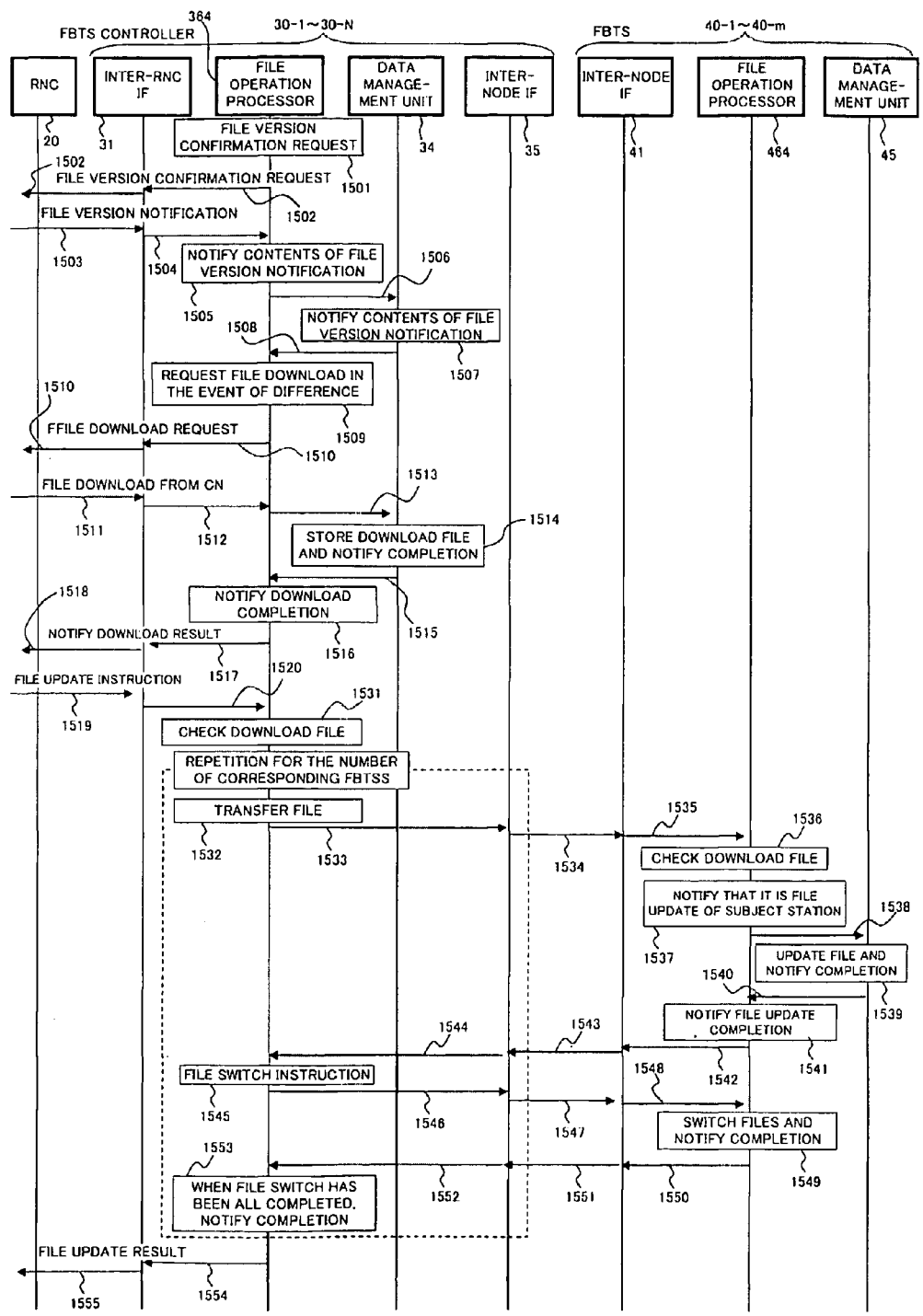
FIG. 24 is a sequence view for use in describing one example of the file update processing for the FBTS illustrated in FIG. 1.

On the other hand, when the downloaded file is destined for the FBTS 40-*j* in the checking processing 1565 (FIG. 25), the file management processor 364 checks the type of maker and the model number of an update target apparatus, based on the information of the file header in the downloaded file (the processing 1531 in FIG. 24), and transfers the downloaded file to the corresponding FBTS 40-*j* (the processing 1532 to the processing 1534 in FIG. 24, and the processing 1567 in FIG. 25).

In the FBTS 40-*j*, the transferred file is received by the file management processor 464 through the inter-node IF 41 (the processing 1534 and the processing 1535 in FIG. 24). The file management processor 464 checks whether or not the received file is a file for the subject station (FBTS) 40-*j*, based on the information of the file header in the received file (the processing 1536 in FIG. 24).

The file management processor 464 notifies the data control unit 45 of the file updating of the subject station 40-*j* (the processing 1537 and the processing 1538 in FIG. 24). By receiving the notification, the data control unit 45 updates the file according to the file received from the FBTS controller 30-*i* (the processing 1568 in FIG. 25), and upon completion, it notifies the file management processor 464 of the completion (the processing 1539 and the processing 1540 in FIG. 24).

By receiving the above completion notification, the file management processor 464 notifies the FBTS controller 30-*i* of the completion (the processing 1541 to the processing 1543 in FIG. 24, and the processing 1569 in FIG. 25).

In the FBTS controller 30-*i*, when the file management processor 364 receives the completion notification of the file update through the inter-node IF 35 (the processing 1544 in FIG. 24), the file management processor 364 checks whether or not all the files of the corresponding FBTSs 40-*j* have been updated, for synchronization of a file switch. When all the files have been updated, the file management processor 364 instructs the respective FBTSs 40-*j* to switch files (the processing 1545 to the processing 1547 in FIG. 24).

In the FBTS 40-*j*, when the file management processor 464 receives the instruction of the file switch through the inter-node IF 41 (the processing 1548 in FIG. 24), the file management processor 464 switches the files and notifies the FBTS controller 30-*i* of the completion (the processing 1549 to the processing 1551 in FIG. 24).

In the FBTS controller 30-*i*, when the file management processor 364 receives the completion notification of the file switch through the inter-node IF 35 (the processing 1552 in FIG. 24), the file management processor 364 checks whether all the files of the corresponding FBTSs 40-*j* have been switched. When all the files have been switched, the file management processor 364 creates data (message) for notifying update result and transmits it to the CN 10 (file server), hence to notify the CN 10 of the completion of the file update (the processing 1553 to the processing 1555 in FIG. 24, and the processing 1570 and the processing 1571 in FIG. 25).

(3.3.3) File Updating in Every Group of FBTSs

Next, an management example in the case of updating a file of the FBTS 40-*j* in every group #k described above will be described using FIGS. 26 to 28.

Figure 26:
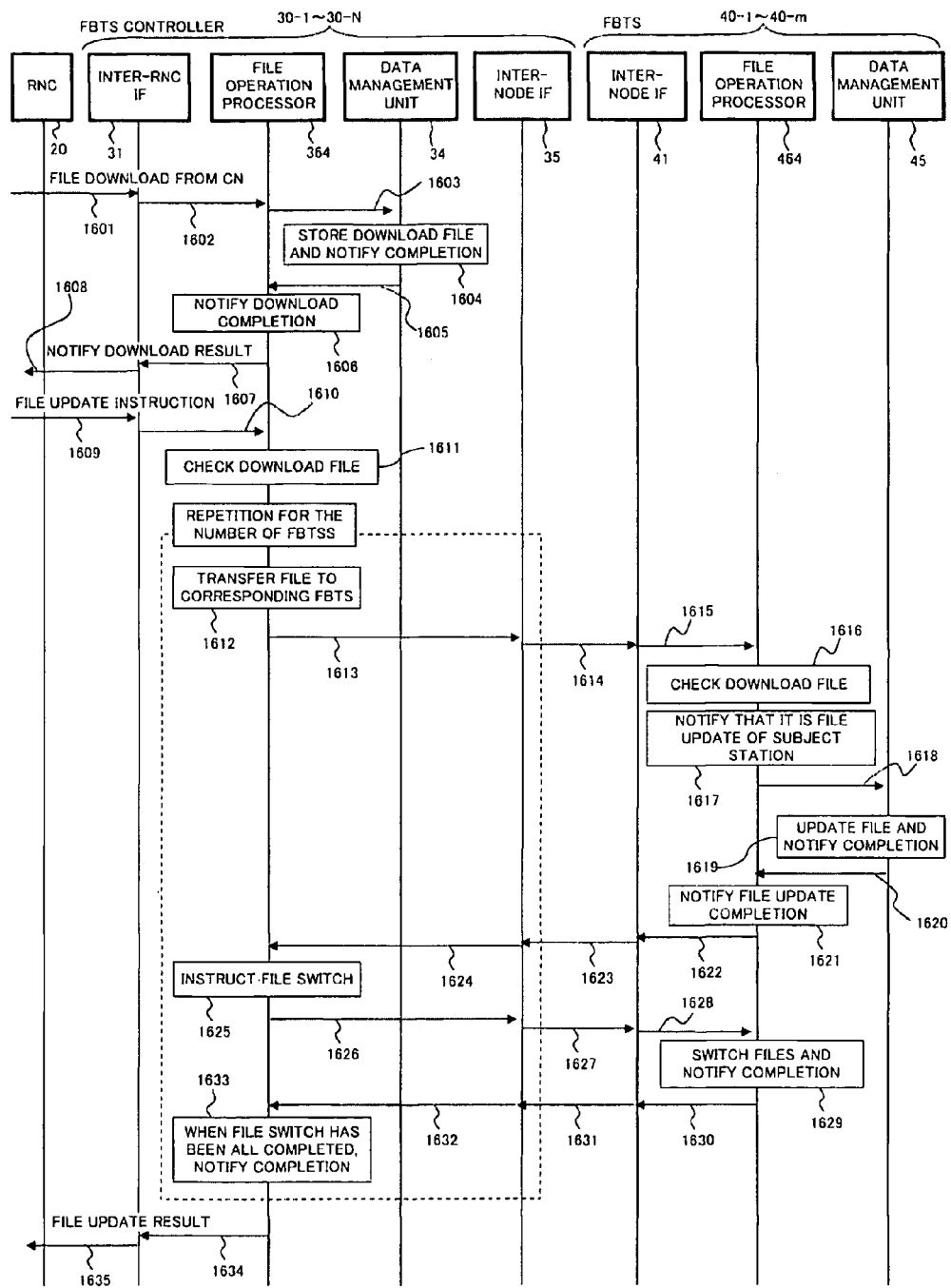
FIG. 26 is a sequence view for describing one example of the file update processing in every group for the FBTS illustrated in FIG. 1.

As illustrated in FIG. 26, the FBTS controller 30-*i* downloads a file, for example, according to the management from the CN 10 (file server). The file is received by the file management processor 364 through the inter-RNC interface 31 and transferred to the data control unit 34 (the processing 1601 to the processing 1603 in FIG. 26, and the processing 1641 in FIG. 27). The data control unit 34 stores the transferred file and when the file has been stored, it notifies the file management processor 364 of the completion (the processing 1604 and the processing 1605 in FIG. 26).

By receiving the above notification from the data control unit 34, the file management processor 364 notifies the CN 10 (file server) of the download completion (the processing 1606 to the processing 1608 in FIG. 26).

Figure 27:
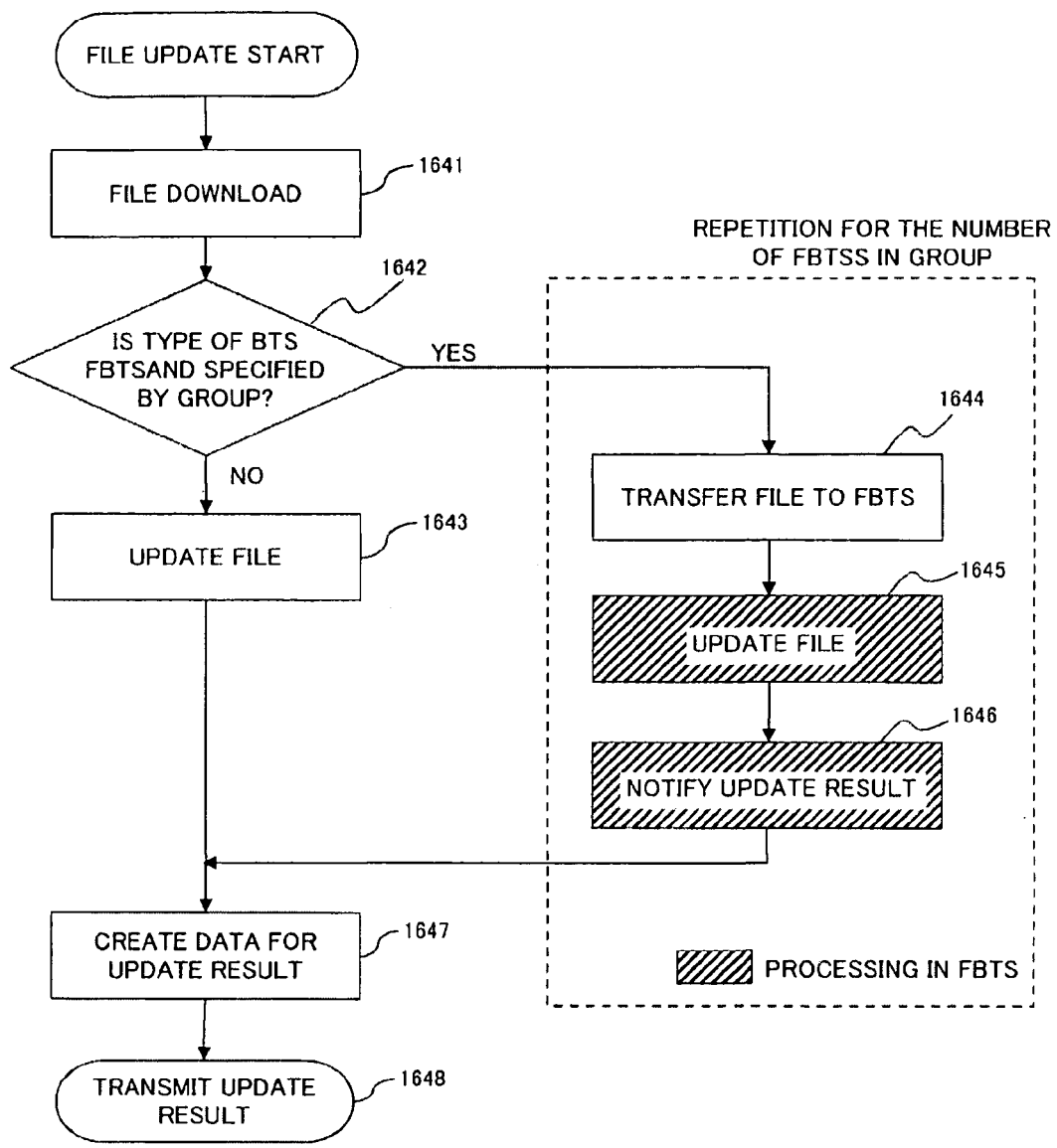
FIG. 27 is a flow chart for use in describing one example of the file update processing in every group for the FBTS illustrated in FIG. 1.

Thereafter, when the file management processor 364 receives a file update instruction from the CN 10 (file server) through the inter-RNC interface 31 (the processing 1609 and the processing 1610 in FIG. 26), it checks whether the downloaded file is a file destined for the FBTS 40-*j* and specified by the group, according to the information of the file header and the contents of the file update instruction (the processing 1611 in FIG. 26 and the processing 1642 in FIG. 27).

Figure 28:
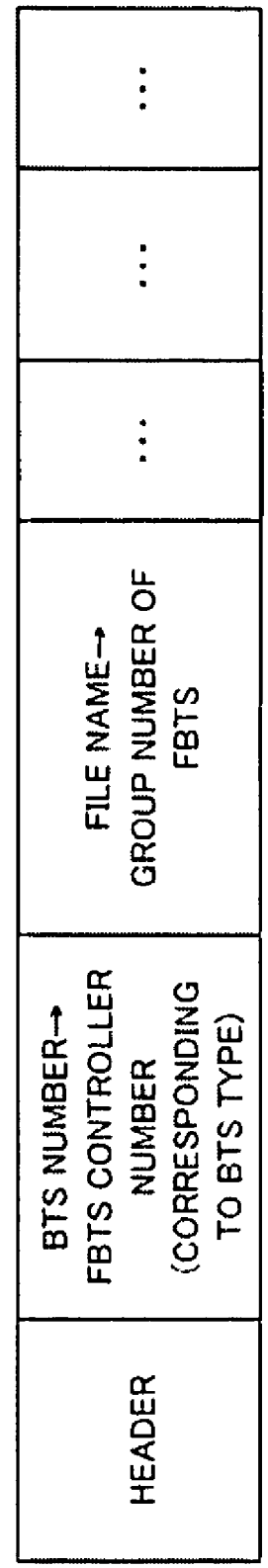
FIG. 28 is a view illustrating a format example of the file update instruction for the FBTS controller illustrated in FIG. 1.

The above file update instruction (message) may adopt a message format for use in the existing file update instruction. The format example is illustrated in FIG. 28. The format illustrated in FIG. 28 includes a header field, a BTS number field, and a file name field. In the BTS number field, apparatus number of the FBTS controller 30-*i* corresponding to the information indicating the type of BTS can be set, instead of the apparatus number of the existing BTS. In the file name field, group number of the FBTSs 40-*j* can be set instead of file name.

For example, when a apparatus number of the FBTS controller 30-*i* is set in the BTS number field and any group number of the FBTSs 40-*j* is not set in the file name field, the file management processor 364 determines that the received message is the filed update instruction for the FBTS controller 30-*i*.

In this case, the file management processor 364 updates files stored in the data control unit 34 according to the downloaded file and notifies the CN 10 (file server) of the update completion, similarly to the processing 1412 to the processing 1418 in FIG. 18 (the processing 1643 in the NO route from the processing 1642, and the processing 1647 and the processing 1648 in FIG. 27).

On the other hand, for example, when any apparatus number of the FBTS controller 30-*i* is not set in the BTS number field and a group number of the FBTSs 40-*j* is set in the file name field, the file management processor 364 determines that the received message is the file update instruction for the respective FBTSs 40-*j* belonging to the specified group #k.

In this case, the file management processor 364 checks the type of maker and the model number of the update target apparatus, according to the information of the file header, and transfers the downloaded file to the FBTSs 40-*j* belonging to the specified group #k (the processing 1612 to the processing 1614 in FIG. 26 and the processing 1642 in the YES route from the processing 1644 in FIG. 27).

The transferred file is received by the inter-node IF 41 of the FBTS 40-*j* and transferred to the file management processor 464 (the processing 1614 and the processing 1615 in FIG. 26). The file management processor 464 checks whether or not the received file is a file for the subject station (FBTS 40-*j*), according to the information of the file header of the received file (the processing 1616 in FIG. 26).

The file management processor 464 notifies (instructs) an update of a file for the subject station 40-*j* to the data control unit 45 (the processing 1617 and the processing 1618 in FIG. 26), and by receiving the above notification, the data control unit 34 updates the file according to the file received from the FBTS controller 30-*i* and when it has been updated, it notifies the file management processor 464 of the completion (the processing 1619 and 1620 in FIG. 26 and the processing 1645 in FIG. 27).

By receiving the completion notification of the file update, the file management processor 464 notifies the FBTS controller 30-*i* of the update completion (the processing 1621 to the processing 1623 in FIG. 26 and the processing 1646 in FIG. 27).

When the file management processor 364 receives the completion notification of the file update from the FBTS 40-*j* (the processing 1624 in FIG. 26), the FBTS controller 30-*i* checks whether or not update of all the files of the FBTS 40-*j* corresponding to the specified group #k has been completed, for synchronization of a file switch; when all the files have been updated, it instructs the respective FBTSs 40-*j* belonging to the corresponding group #k to switch the files (the processing 1625 to the processing 1627 in FIG. 26).

In the FBTS 40-*j*, when the file management processor 464 receives the above instruction of the file switch through the inter-node IF 41 (the processing 1628 in FIG. 26), the file management processor 464 switches the files and upon completion of the file switch, it notifies the FBTS controller 30-*i* of the completion (the processing 1629 to the processing 1631 in FIG. 26 and the processing 1646 in FIG. 27).

In the FBTS controller 30-*i*, when the file management processor 364 receives the completion notification of the file switch from the FBTS 40-*j* through the inter-node IF 35 (the processing 1632 in FIG. 26), the file management processor 364 checks whether all the files of the corresponding FBTSs 40-*j* have been switched, and when all have been switched, it notifies the CN 10 (file server) of the completion of the file update (the processing 1633 to the processing 1635 in FIG. 26 and the processing 1647 and the processing 1648 in FIG. 27).

The above file update by specifying a group is supposed to be used in the case where a construction area is regarded as a group and, for example, a test management is collectively done on all the FBTSs 40-*j* in the construction area (group).

The above example is one example of the file update in every group according to the management from the CN 10 (file server) and the autonomous file update in every group as having been described in the section (3.3.2.2) is also possible.

(3.3.4) Version Information Notification in Every Group

This time, an management example that the FBTS controller 30-*i* administers file versions of the respective files stored by the respective subordinate FBTSs 40-*j* in every group #k and notifies the version information to the OPS 70 will be described using FIG. 29 and FIG. 30.

Figure 29:
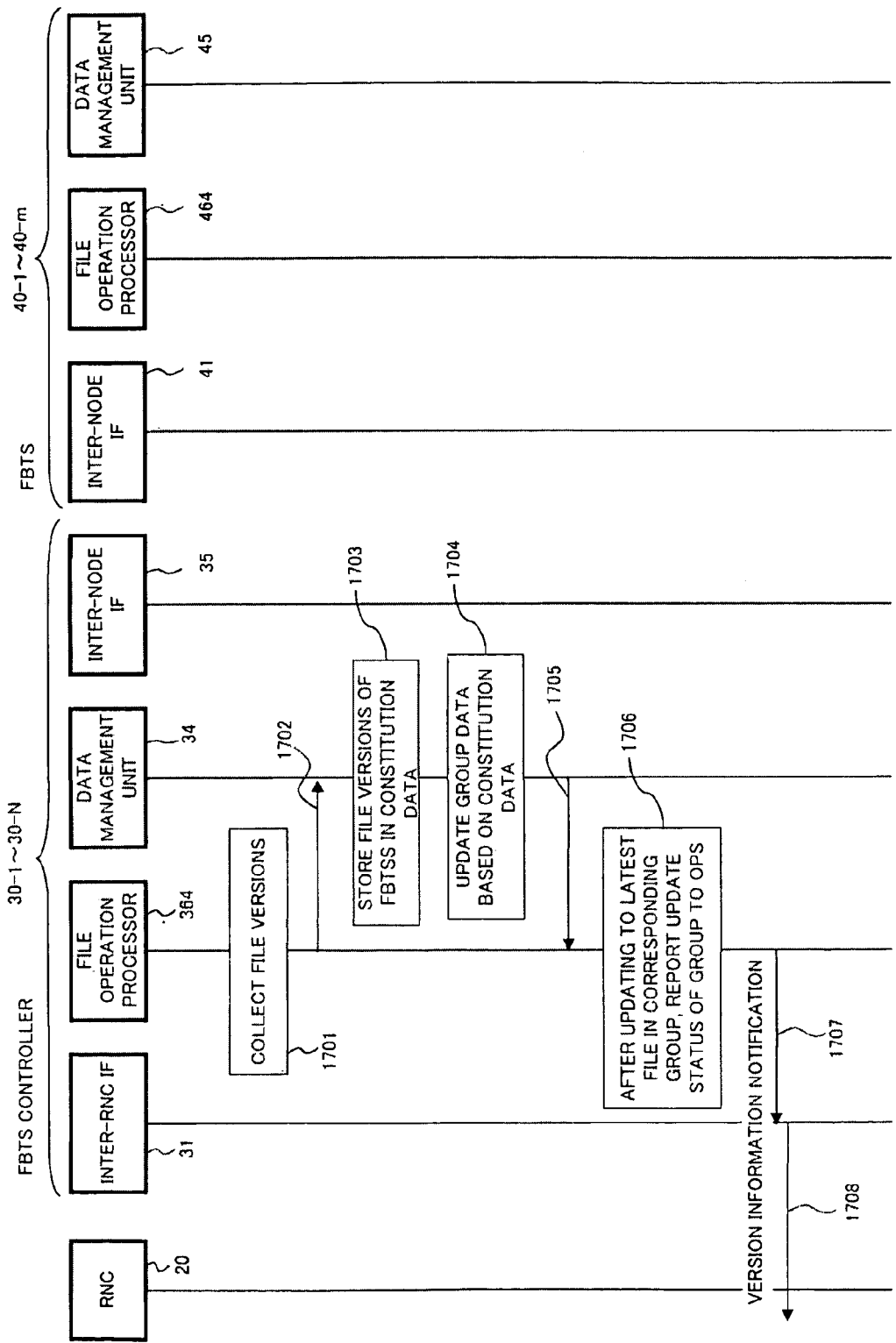
FIG. 29 is a sequence view for use in describing one example of the processing for notifying the file version information of the FBTS for every group in the system illustrated in FIG. 1.
Figure 30:
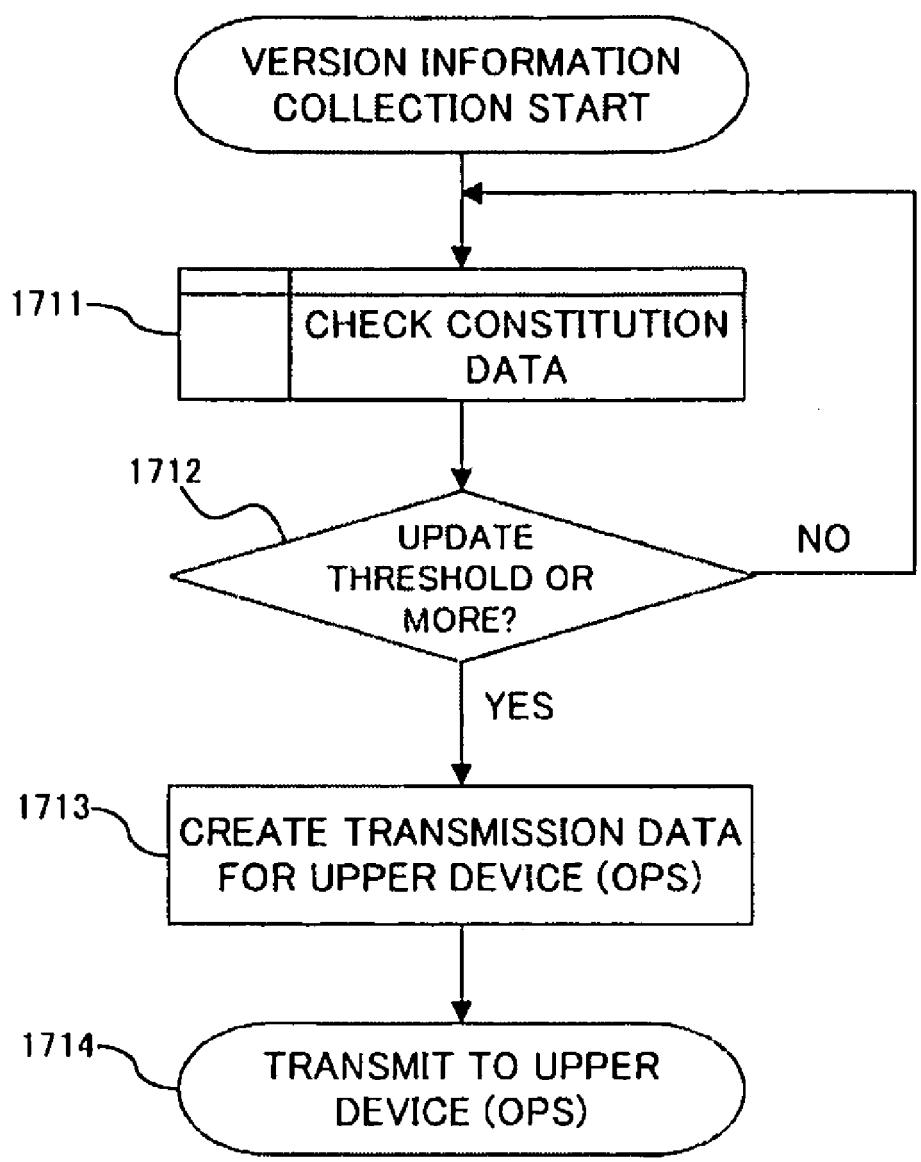
FIG. 30 is a flow chart for use in describing one example of the processing for notifying the file version information of the FBTS for every group in the system illustrated in FIG. 1.

As illustrated in FIG. 29, in the FBTS controller 30-*i*, the file management processor 364 collects the file versions of the files stored by the subordinate FBTSs 40-*j* (the processing 1701). This collection can be performed, for example, in each one of the above-described file update processing.

The file management processor 364 notifies the data control unit 34 of the collected file versions (the processing 1702). By receiving this notification, the data control unit 34 stores (updates) the notified file versions as element information of the constitution data by apparatuses (the processing 1703). This can be performed, for example, in each one of the above-described file update processing. One example of the above is illustrated in the following table 11.

TABLE 11

Constitution Data by Apparatuses

| Apparatus Number | Group Number | IP Address | Version | File Identifier | ... |
|---|---|---|---|---|---|
| Femto Cell BTS#1 | #1 | xx.xx.xx.xx | V01L00 | .CEF | ... |
| Femto Cell BTS#2 | #1 | yy.yy.yy.yy | V02L00 | .DEF | ... |
| Femto Cell BTS#3 | #1 | zz.zz.zz.zz | V01L00 | .DEF | ... |
| Femto Cell BTS#4 | #2 | jj.jj.jj.jj | V02L00 | .EEF | ... |
| Femto Cell BTS#5 | #2 | kk.kk.kk.kk | V02L00 | .EEF | ... |
| ... | ... | ... | ... | ... | ... |
| Femto Cell BTS#m | #n | ... | ... | ... | ... |

This table 11 illustrates that assuming the latest file version of the respective files including the file identifiers (hardware version number) ".CEF", ".DEF", and ".EEF" is "V02L00", the FBTS #2, #4, and #5 have the latest file version (V02L00) while the FBTS #1 and #3 don't have the latest one (V01L00).

The data control unit 34 requires an update rate of file version in every group #k according to this constitution data by apparatuses, and updates the constitution data by groups (the processing 1704). In the example of the above table 11, of the three FBTSs #1, #2, and #3 belonging to the group #1, there is only one FBTS having the latest file version (V02L00) and therefore, the update rate becomes 1/3. Similarly, of the two FBTSs #4 and #5 belonging to the group #2, the both have the latest file version and therefore, the update rate becomes 2/2.

The constitution data by groups will be updated, for example, as illustrated in the following table 12.

TABLE 12

Constitution Data by Groups

| Group Number | Update Rate | Update Rate Threshold | ... |
|---|---|---|---|
| Group #1 | 1/3 | Notify at 2/3 or less | ... |
| Group #2 | 2/2 | Notify at 1/2 or less | ... |
| Group #3 | ... | ... | ... |
| ... | ... | ... | ... |
| Group #n | ... | ... | ... |

The update rate threshold can be set in every group #k and the update status of file version can be determined in every group. Namely, as for the group #k having the update rate less than the corresponding threshold, it can be determined that the file update is necessary and further that the file update status has to be notified to the OPS 70. In short, unless the update rate is equal to or less than the update rate threshold as for the group #k, it can be determined that the file update and the update status as for the group #k do not have to be notified to the OPS 70.

The file management processor 364 checks whether there is a group #k whose update rate is equal to the update rate threshold or less (the processing 1711 and the processing 1712 in FIG. 30), by comparison between the update rate and the update rate threshold of each group #k, referring to the constitution data by groups (the processing 1705 in FIG. 29), at a predetermined monitoring timing (periodical timing).

As a result, when there is a group #k whose update rate is equal to the update rate threshold or less (YES in the processing 1712 in FIG. 30), the file management processor 364 updates the file version of each file in the FBTSs 40-j belonging to the group #k. Thereafter, the file management processor 364 creates data (message) for reporting update status and transmits it to the OPS 70, hence to notify the OPS 70 of the file update status (the processing 1706 to the processing 1708 in FIG. 29 and the processing 1713 and the processing 1714 in FIG. 30).

Where there is no group #k whose update rate is equal to the update rate threshold or less (NO in the processing 1712 in FIG. 30), the file management processor 364 enters a waiting state for the next monitoring timing.

The above processing can induce the OPS 70 (operator) to update a file, for example, when the file fails in update in the autonomous file update processing as mentioned above. At that time, since regularly reporting the file update status of the individual FBTSs 40-j increases the signal amount, the file update status can be reported in every group.

[4] Effect of the Embodiment

According to the above mentioned embodiment, the following effects or benefits can be selectively or additionally obtained (in a combination).

(1) The FBTS 40-j (the failure monitoring processor 463) can autonomously detect a failure (fault) of the subject station. Further, it can notify the corresponding failure information to the FBTS controller 30-i.

(2) The FBTS 40-j (the traffic processor 461) can autonomously detect the congestion of the subject station while monitoring a traffic state of the subject station. When detecting the occurrence of congestion, it can autonomously control the calls. Further, it can notify the congestion to the FBTS controller 30-i.

(3) The file management processor 364 of the FBTS controller 30-i and the file management processor 464 of the FBTS 40-j can remotely update various files of the FBTSs 40-j from the side of the CN 10 and the OPS 70.

(4) The FBTS controller 30-i (the failure monitoring processor 363) can notify the failure information received from the FBTS 40-j to the upper OPS 70.

(5) The FBTS controller 30-i (the failure monitoring processor 363) can autonomously detect a failure of the subject station. Further, the corresponding failure information can be notified to the upper OPS 70.

(6) The FBTS controller 30-i (the congestion detecting processor 362) can monitor the congestions in the FBTSs 40-j and notify the monitoring result to the upper OPS 70.

(7) The FBTS controller 30-i (the failure monitoring processor 363) can monitor the congestions in the FBTSs 40-j and notify the monitoring result to the upper OPS 70. Further, it can perform a call control on the congested FBTS 40-j.

(8) The FBTS controller 30-i (the congestion detecting processor 362) can autonomously check the congestion according to the failure information and the traffic state of the subject station and perform the call control on the subordinate FBTSs 40-j. Further, it can notify the congestion of the FBTS controller 30-i to the OPS 70.

(9) The file management processor 364 of the FBTS controller 30-i can remotely update various files of the FBTS controller 30-i from the side of the CN 10 and the OPS 70.

(10) Introduction of the above FBTS controller 30-i enables a large number (several thousands) of FBTSs 40-j to be accommodated in the RNC 20 even when the RNC 20 has a limited capacity of accommodating the existing BTSs (for example, hundred or so), without adding extensive modification to the upper system including the RNC 20. Therefore, wireless coverage can be enlarged easily at a low cost.

(11) Introduction of the above FBTS controller 30-*i* enables the failure monitoring in the FBTS controller 30-*i* and/or the FBTS 40-*j* easily, without adding extensive modification to the upper system including the RNC 20. Further, the probability of notifying all the failure information of the FBTSs 40-*j* to the upper apparatus (OPS 70) and missing monitoring can be reduced. Therefore, it is not necessary to control the total number of monitor screens of the FBTSs 40-*j*.

(12) Introduction of the above FBTS controller 30-*i* enables monitoring and control of congestions (traffic amount) in the FBTS controller 30-*i* and/or the FBTS 40-*j* easily, without adding extensive modification to the upper system including the RNC 20.

(13) Introduction of the above FBTS controller 30-*i* enables a file management (update and the like) in the FBTS controller 30-*i* and/or the FBTS 40-*j* easily, without adding extensive modification to the upper system including the RNC 20. Therefore, even when there is a large number (several thousands) of FBTSs 40-*j*, their program files and setting files can be administered and updated (version-up and the like) easily at a low cost.

All examples and conditional language recited herein are intended for pedagogical purposes to aid the reader in understanding the invention(s) and the concepts contributed by the inventor(s) to furthering the art, and are to be construed as being without limitation to such specifically recited examples and conditions, nor does the organization of such examples in the specification relate to a showing of the superiority and inferiority of the invention. Although the embodiment(s) has been described in detail, it should be understood that the various changes, substitutions, and alterations could be made hereto without departing from the spirit and scope of the invention(s).

What is claimed is:

1. A wireless communication system, comprising:
   a plurality of wireless base stations, and
   an apparatus for management, control, and maintenance that groups the wireless base stations into a plurality of groups and performs processing about management, control and maintenance of the wireless base stations selectively for each of the groups, wherein
   the apparatus stores threshold about a number of failures of the wireless base stations for each of the groups and monitors event of a failure in the wireless base stations, and determines that a failure has occurred in one of the groups when the number of failures in the group is equal to the threshold or more.

2. A method of management, control, and maintenance, the method comprising:
   controlling a plurality of wireless base stations grouped into a plurality of groups,
   storing threshold about a number of failures of the wireless base stations for each of the groups,
   monitoring event of a failure in the wireless base stations, and
   determining that a failure has occurred in one of the groups when the number of failures in the group is equal to the threshold or more.

3. An apparatus for management, control, and maintenance, the apparatus comprising:
   a control unit that administers a plurality of wireless base stations grouped into a plurality of groups, and
   a processor that performs processing about management, control and maintenance of the wireless base stations selectively for each of the groups, wherein
   the control unit stores threshold about a number of failures of the wireless base stations for each of the groups, and
   the processor monitors event of a failure in the wireless base stations, and determines that a failure has occurred in one of the groups when the number of failures in the group is equal to the threshold or more.

4. The apparatus for management, control, and maintenance according to claim 3, wherein the processor determines that no failure has occurred in the group of the wireless base stations when the number of failures is less than the threshold in the group.

5. The apparatus for management, control, and maintenance according to claim 3, wherein the processor notifies failure information to an upper apparatus of the apparatus for management, control, and maintenance when it is determined that a failure has occurred in the group.

6. The apparatus for management, control, and maintenance according to claim 3, wherein the processor monitors the event of a failure by receiving the failure information from each of the wireless base stations.

7. The apparatus for management, control, and maintenance according to claim 3, wherein the processor monitors the event of a failure also in the apparatus for management, control, and maintenance and notifies the monitoring result to the upper apparatus of the apparatus for management, control, and maintenance.

8. An apparatus for management, control, and maintenance, the apparatus comprising:
   a control unit that administers a plurality of wireless base stations grouped into a plurality of groups, and
   a processor that performs processing about management, control and maintenance of the wireless base stations selectively for each of the groups, wherein
   the control unit stores threshold about congestion of the wireless base stations for each of the groups, and
   the processor monitors congestions of the wireless base stations and determines that congestion has occurred in one of the groups when the congestion in the group is equal to the threshold or more.

9. The apparatus for management, control, and maintenance according to claim 8, wherein the processor determines that no congestion has occurred in a group when the congestion in the group is less than the threshold.

10. The apparatus for management, control, and maintenance according to claim 8, wherein, when it is determined that congestion has occurred in a group, the processor notifies the upper apparatus of the apparatus for management, control, and maintenance of the determination.

11. The apparatus for management, control, and maintenance according to claim 8, wherein the processor monitors the congestion by receiving notification of congestions detected by each of the wireless base stations.

12. The apparatus for management, control, and maintenance according to claim 8, wherein the processor monitors the congestion by receiving notification of a communication traffic amount measured by each of the wireless base stations.

13. The apparatus for management, control, and maintenance according to claim 8, wherein the processor monitors the congestion of the apparatus for management, control, and maintenance and notifies the monitoring result to the upper apparatus of the apparatus for management, control, and maintenance.

14. The apparatus for management, control, and maintenance according to claim 8, wherein the processor controls calls in each of the wireless base stations belonging to a group determined to have the congestion.

15. An apparatus for management, control, and maintenance, the apparatus comprising:
- a control unit that administers a plurality of wireless base stations grouped into a plurality of groups, and
- a processor that performs processing about management, control and maintenance of the wireless base stations selectively for each of the groups, wherein
- the control unit stores threshold about an update rate of a file stored by the wireless base stations for each of the groups, and
- the processor monitors the update rate of the file stored by the respective wireless base stations, and updates the file of each of the wireless base stations belonging to one of the groups when the update rate in the group exceeds the threshold.

16. The apparatus for management, control, and maintenance according to claim 15, wherein the processor determines that update of the file is not necessary when the update status is equal to the threshold or less.

17. The apparatus for management, control and maintenance, according to claim 15, wherein the processor notifies information about the update rate exceeding the threshold of the update rate to the upper apparatus of the apparatus for management, control, and maintenance.

18. The apparatus for management, control, and maintenance according to claim 3, wherein the wireless base station is a femtocell station.

19. The apparatus for management, control, and maintenance according to claim 3, wherein the group is set depending on a setting place of the wireless base station.

\* \* \* \* \*